(12) United States Patent
Messner et al.

(10) Patent No.: US 7,516,711 B2
(45) Date of Patent: Apr. 14, 2009

(54) BUCKLE SUPPORT ASSEMBLY AND MANUFACTURING METHOD AND SYSTEM

(75) Inventors: Thomas Messner, Grand Blanc, MI (US); Richard Jodts, Clinton Township, MI (US); Steve Marzi, Burton, MI (US); Marco Amaya, Nuevo Leon (MX); Juan Espinosa, Nuevo Leon (MX); Carlos Camarillo, Nuevo Leon (MX); Paul Smith, Davison, MI (US)

(73) Assignee: Takata Seat Belts, Inc., Auburn Hills, MI (US)

( * ) Notice: Subject to any disclaimer, the term of this patent is extended or adjusted under 35 U.S.C. 154(b) by 0 days.

(21) Appl. No.: 11/777,429

(22) Filed: Jul. 13, 2007

(65) Prior Publication Data

US 2008/0001388 A1    Jan. 3, 2008

Related U.S. Application Data

(63) Continuation of application No. PCT/US2006/001174, filed on Jan. 12, 2006.

(60) Provisional application No. 60/643,466, filed on Jan. 13, 2005, provisional application No. 60/680,110, filed on May 12, 2005.

(51) Int. Cl.
*D05B 23/00*    (2006.01)
*D05B 35/00*    (2006.01)

(52) U.S. Cl. .................... 112/475.01; 112/475.06; 112/475.08; 112/470.33

(58) Field of Classification Search ............ 112/475.06, 112/475.08, 475.17, 470.33, 470.34, 147; 280/801.1, 801.2, 802–808; 24/633; 297/468–488; 244/151 R See application file for complete search history.

(56) References Cited

U.S. PATENT DOCUMENTS

| | | | | |
|---|---|---|---|---|
| 2,475,631 | A * | 7/1949 | Miller et al. | 244/151 R |
| 2,715,984 | A * | 8/1955 | Brownstein | 223/49 |
| 3,134,626 | A | 5/1964 | Von Ardenne et al. | |
| 3,150,804 | A * | 9/1964 | Edelman | 223/49 |
| 3,165,168 | A * | 1/1965 | Rose | 182/3 |
| 3,890,002 | A * | 6/1975 | Warmskessel | 297/472 |
| 3,898,119 | A * | 8/1975 | Barr et al. | 156/202 |
| 4,103,933 | A | 8/1978 | Fisher et al. | |

(Continued)

FOREIGN PATENT DOCUMENTS

EP    0 327 968    8/1989

OTHER PUBLICATIONS

International Search Report and Written Opinion dated Oct. 24, 2007, based on corresponding International Application No. PCT/US06/01174.

*Primary Examiner*—Ismael Izaguirre
(74) *Attorney, Agent, or Firm*—Fitch, Even, Tabin & Flannery

(57) ABSTRACT

A support assembly is disclosed generally including a buckle component or components and a positioning member of flexible material that is arranged and configured to support the buckle component in a predetermined elevated position or predetermined positions for multiple components while also allowing for resilient shifting thereof. In the preferred form, the flexible material is belt webbing that has a plurality of fold portions folded and sewn together in a specific manner. Sew patterns are disclosed as well as methods and fixtures for forming the belt webbing positioning member.

6 Claims, 25 Drawing Sheets

U.S. PATENT DOCUMENTS

| | | |
|---|---|---|
| 4,133,556 A | 1/1979 | Glinski |
| 4,137,856 A | 2/1979 | Brauns et al. |
| 4,157,687 A * | 6/1979 | Cislak .................. 112/470.33 |
| 4,387,911 A * | 6/1983 | Takada ....................... 280/802 |
| 4,645,231 A | 2/1987 | Takada |
| 4,915,451 A | 4/1990 | Forget et al. |
| 4,928,992 A | 5/1990 | Qvint et al. |
| 4,955,637 A | 9/1990 | Huber et al. |
| 4,966,393 A | 10/1990 | Tokugawa |
| 5,403,070 A | 4/1995 | Jahn et al. |
| 5,806,450 A | 9/1998 | Dudek et al. |
| 5,855,047 A | 1/1999 | Haas |
| 5,860,706 A | 1/1999 | Fausel |
| 5,961,147 A | 10/1999 | Wier |
| 7,383,620 B2 * | 6/2008 | Smith .......................... 24/633 |

* cited by examiner

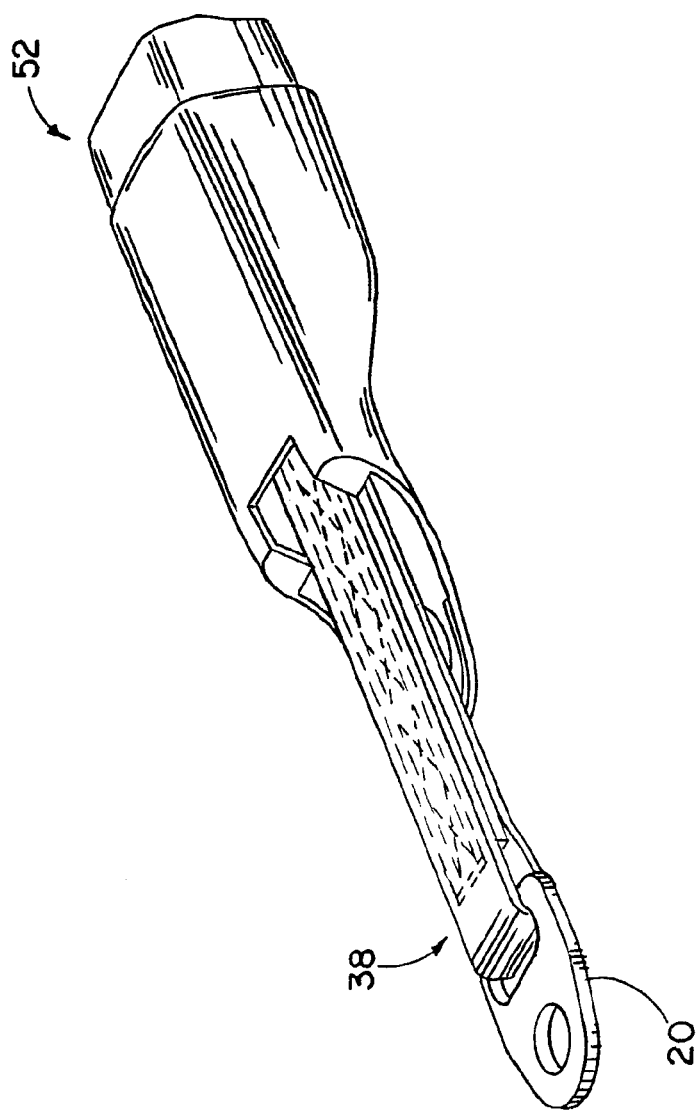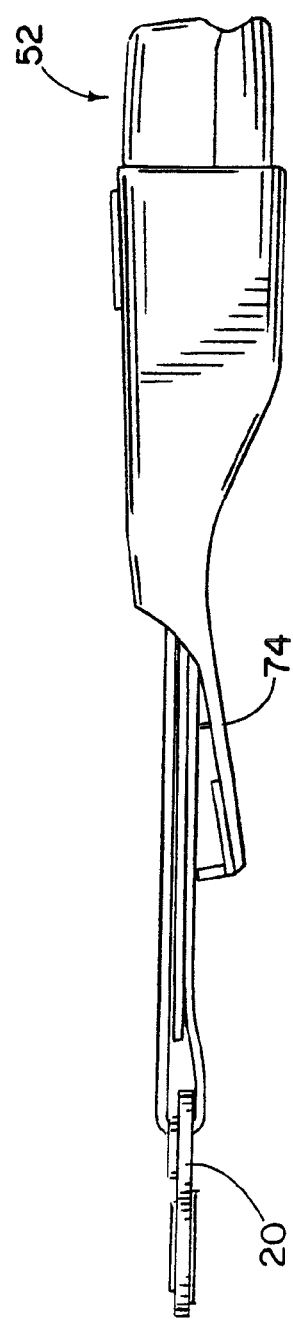

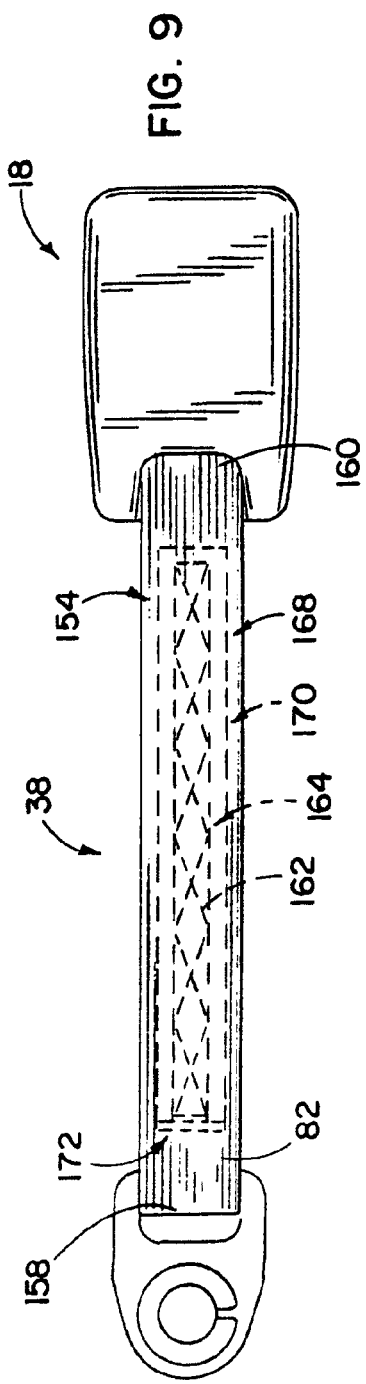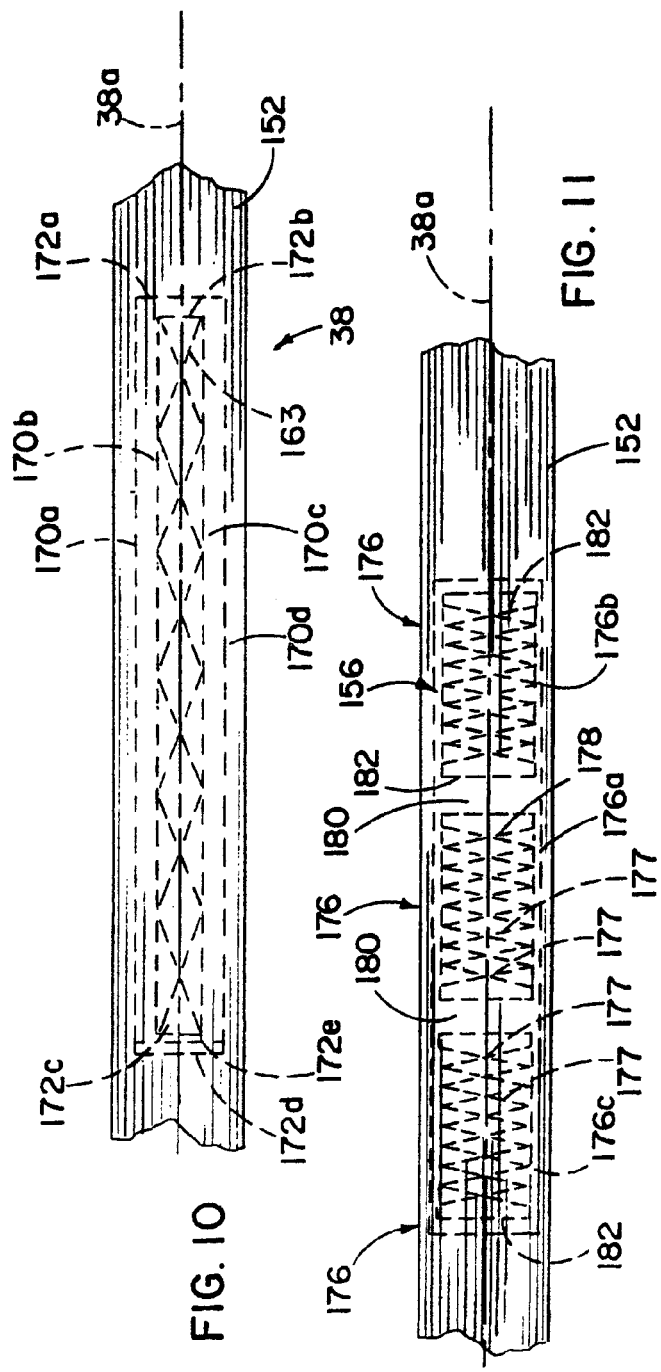

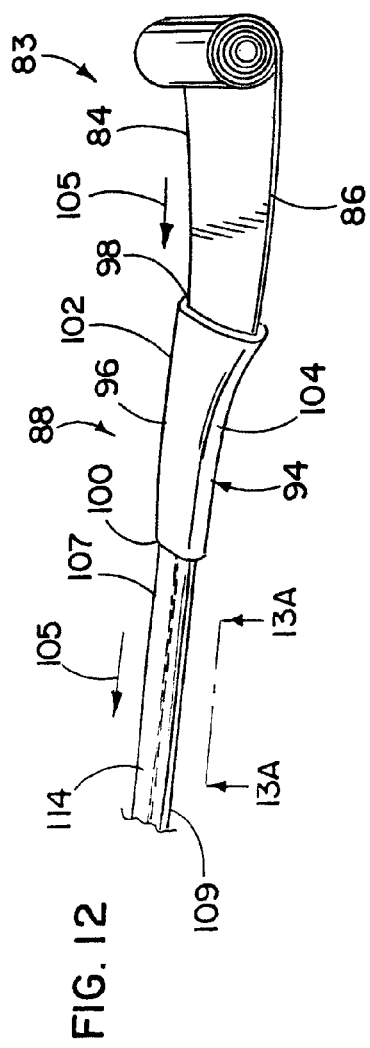
FIG. 12
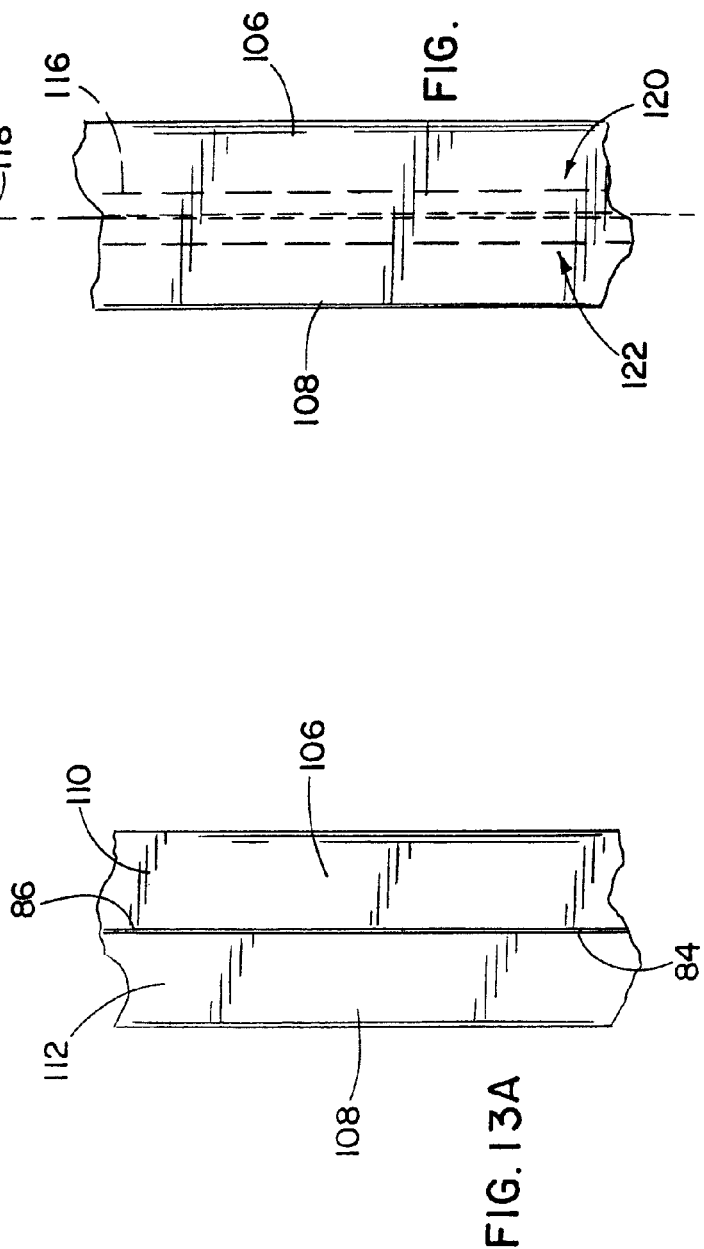
FIG. 13B
FIG. 13A

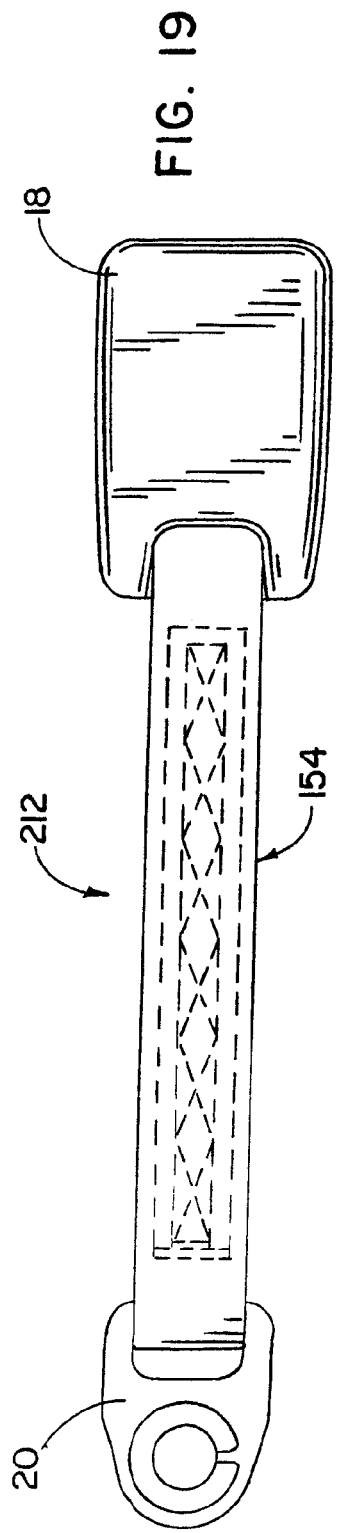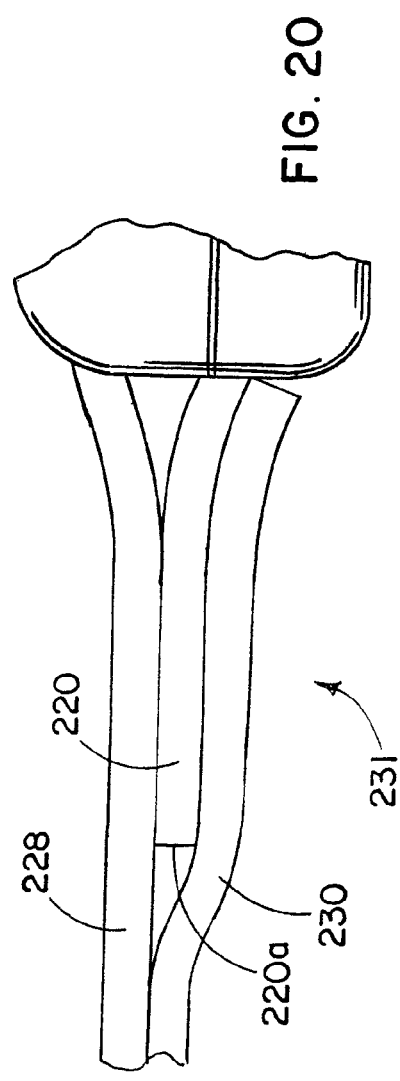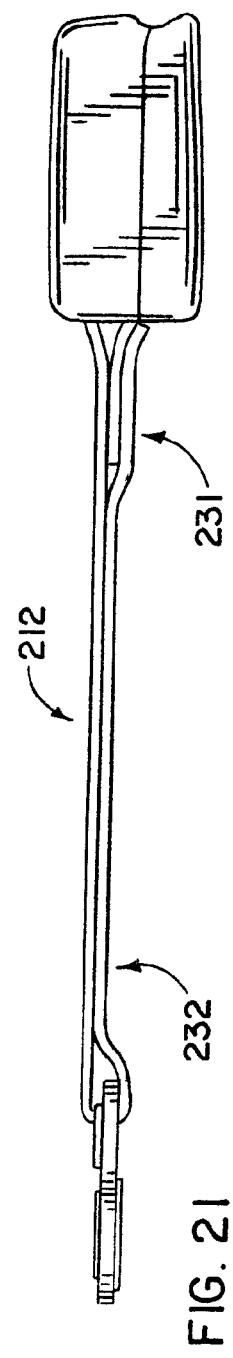

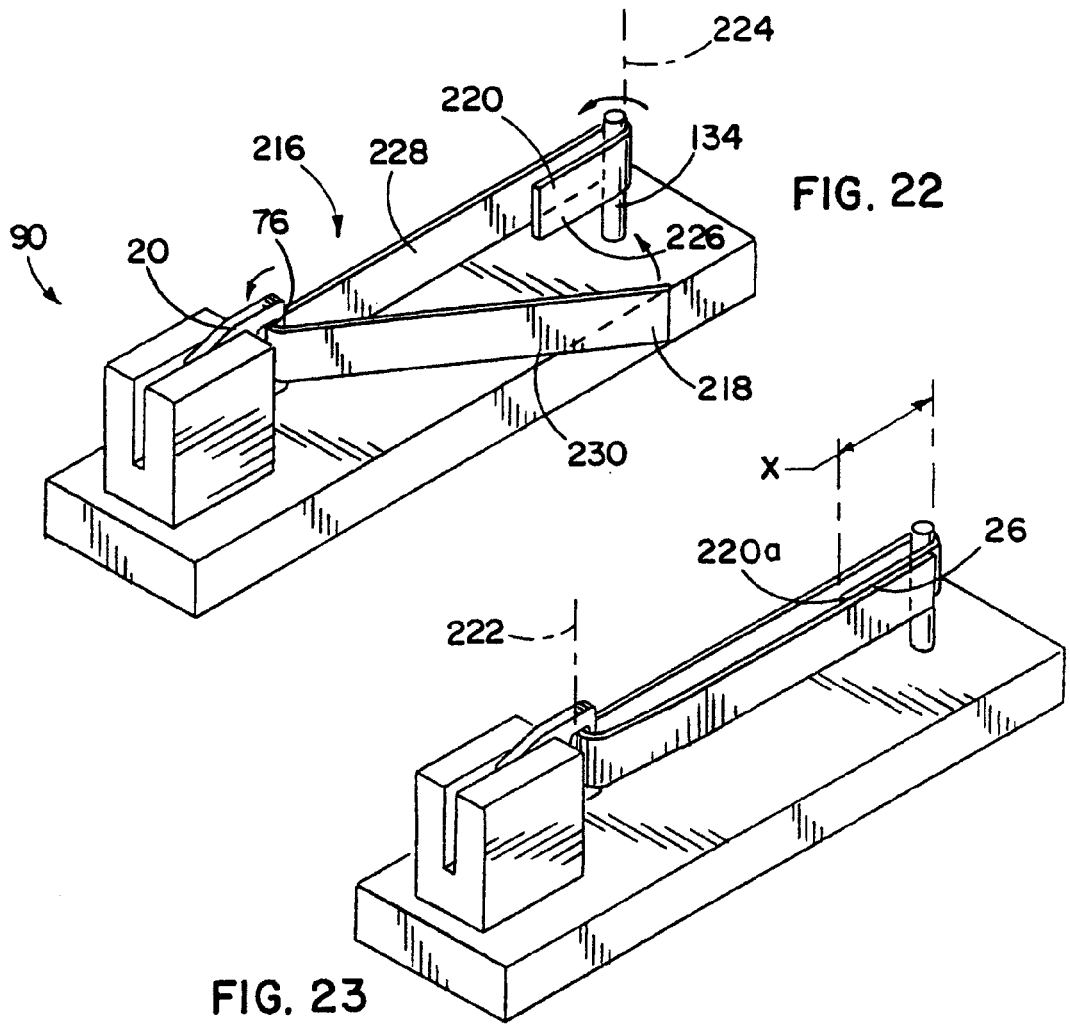
FIG. 22
FIG. 23
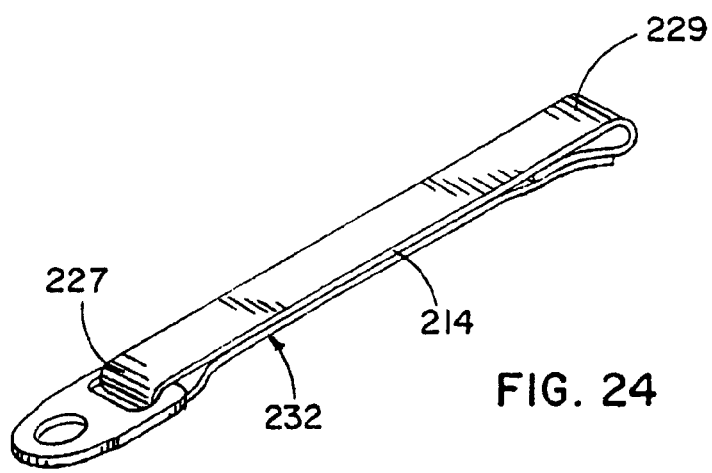
FIG. 24

PV RESULTS

STEEL STRAP MOUNTED BUCKLE - 230MM 1. 21.169 KN
2. 25.170 KN
3. 24.131 KN
4. 25.139 KN
5. 24.988 KN
6. 25.113 KN

AVERAGE : 25.285 KN

DOUBLE THICKNESS TRI-FOLD WEBBING - 3 GROUP STITCH PATTERN 1. 22.341 KN
2. 22.245 KN
3. 21.487 KN
4. 21.115 KN
5. 22.081 KN
6. 22.740 KN

AVERAGE : 22.002 KN

DOUBLE THICKNESS TRI-FOLD WEBBING - CONTINUOUS STITCH PATTERN 1. 22.441 KN
2. 22.043 KN
3. 21.859 KN
4. 23.085 KN
5. 22.815 KN
6. 23.204 KN

AVERAGE : 22.575 KN

DOUBLE THICKNESS BI-FOLD WEBBING - CONTINUOUS STITCH PATTERN 1. 19.704 KN
2. 20.528 KN
3. 20.191 KN
4. 19.628 KN
5. 20.953 KN
6. 20.442 KN

AVERAGE : 20.241 KN

FIG. 27

FLEXIBILITY TEST

FIG. 29

DOUBLE THICKNESS BI-FOLD WEBBING

STEEL BAR PLACED @ 50MM FROM ANCHOR
FORCE NEEDED TO BEND

| BENDING | 10MM | 20MM | 30MM |
|---|---|---|---|
| 1.- | 1 N | 1 N | 2 N |
| 2.- | 1 N | 1 N | 1 N |
| 3.- | 1 N | 1 N | 1 N |
| 4.- | 1 N | 1 N | 1 N |
| 5.- | 1 N | 1 N | 1 N |
| 6.- | 1 N | 1 N | 1 N |

DOUBLE THICKNESS BI-FOLD WEBBING

STEEL BAR PLACED @ 100MM FROM ANCHOR
FORCE NEEDED TO BEND

| BENDING | 10MM | 20MM | 30MM |
|---|---|---|---|
| 1.- | 1 N | 2 N | 2 N |
| 2.- | 1 N | 2 N | 3 N |
| 3.- | 2 N | 2 N | 2 N |
| 4.- | 1 N | 2 N | 2 N |
| 5.- | 1 N | 2 N | 2 N |
| 6.- | 1 N | 2 N | 2 N |

DOUBLE THICKNESS TRI-FOLD WEBBING

STEEL BAR PLACED @ 50MM FROM ANCHOR
FORCE NEEDED TO BEND

| BENDING | 10MM | 20MM | 30MM |
|---|---|---|---|
| 1.- | 3 N | 3 N | 4 N |
| 2.- | 3 N | 3 N | 3 N |
| 3.- | 2 N | 3 N | 4 N |
| 4.- | 3 N | 4 N | 5 N |
| 5.- | 3 N | 4 N | 5 N |
| 6.- | 3 N | 4 N | 5 N |

DOUBLE THICKNESS TRI-FOLD WEBBING

STEEL BAR PLACED @ 100MM FROM ANCHOR
FORCE NEEDED TO BEND

| BENDING | 10MM | 20MM | 30MM |
|---|---|---|---|
| 1.- | 4 N | 5 N | 7 N |
| 2.- | 4 N | 5 N | 8 N |
| 3.- | 3 N | 6 N | 8 N |
| 4.- | 3 N | 5 N | 7 N |
| 5.- | 3 N | 5 N | 5 N |
| 6.- | 3 N | 5 N | 7 N |

FLEXIBILITY TEST

STEEL STRAP
STEEL BAR PLACED @ 50MM FROM ANCHOR
FORCE NEEDED TO BEND

| BENDING | 10MM | 20MM | 30MM |
|---|---|---|---|
| 1.- | 15 N | 20 N | 30 N |
| 2.- | 15 N | 21 N | 30 N |
| 3.- | 16 N | 19 N | 30 N |
| 4.- | 16 N | 20 N | 29 N |
| 5.- | 15 N | 20 N | 30 N |
| 6.- | 16 N | 20 N | 30 N |

STEEL STRAP
STEEL BAR PLACED @ 100MM FROM ANCHOR
FORCE NEEDED TO BEND

| BENDING | 10MM | 20MM | 30MM |
|---|---|---|---|
| 1.- | 30 N | 60 N | 128 N |
| 2.- | 30 N | 59 N | 126 N |
| 3.- | 29 N | 61 N | 127 N |
| 4.- | 30 N | 60 N | 128 N |
| 5.- | 30 N | 59 N | 129 N |
| 6.- | 29 N | 60 N | 130 N |

FIG. 30

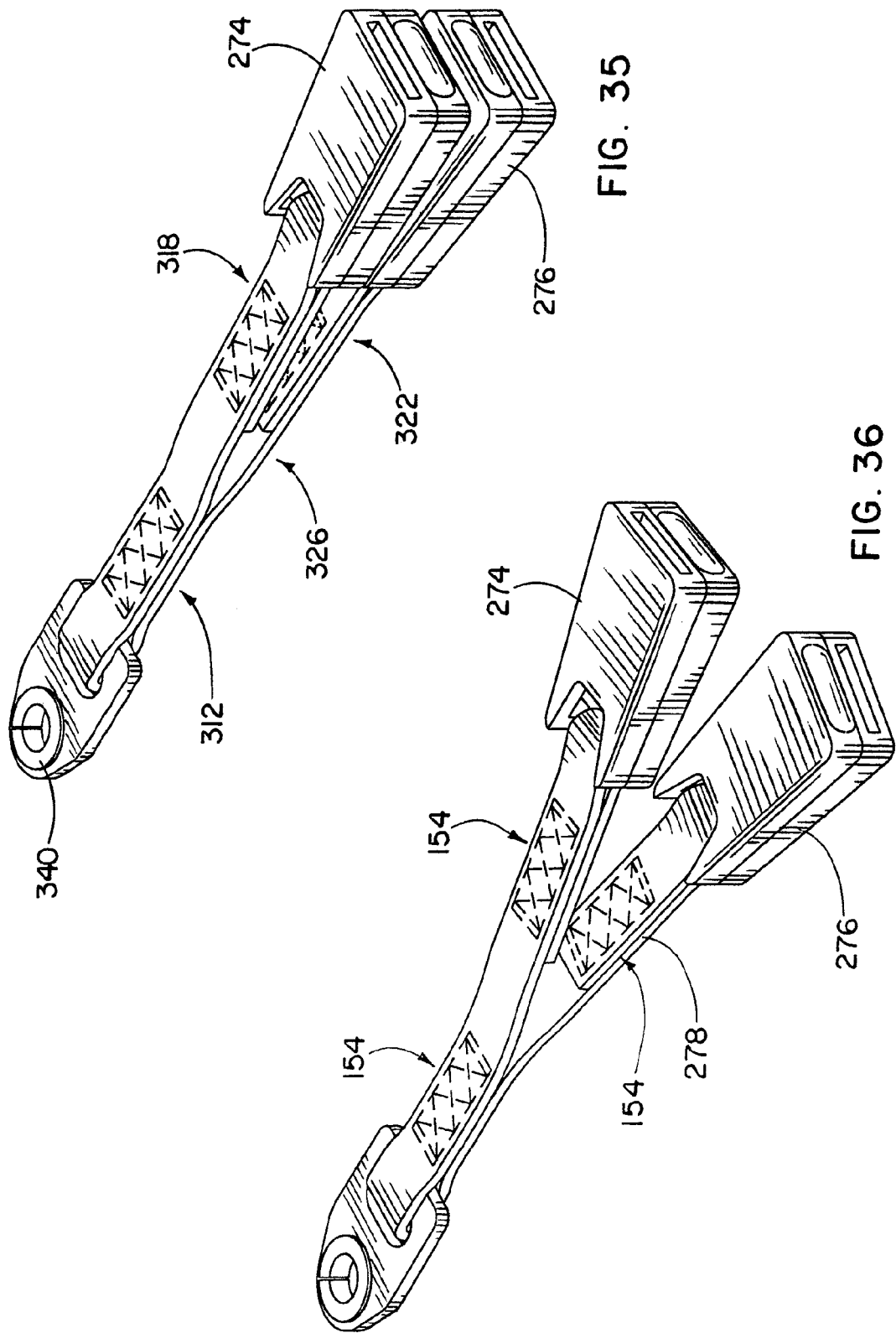

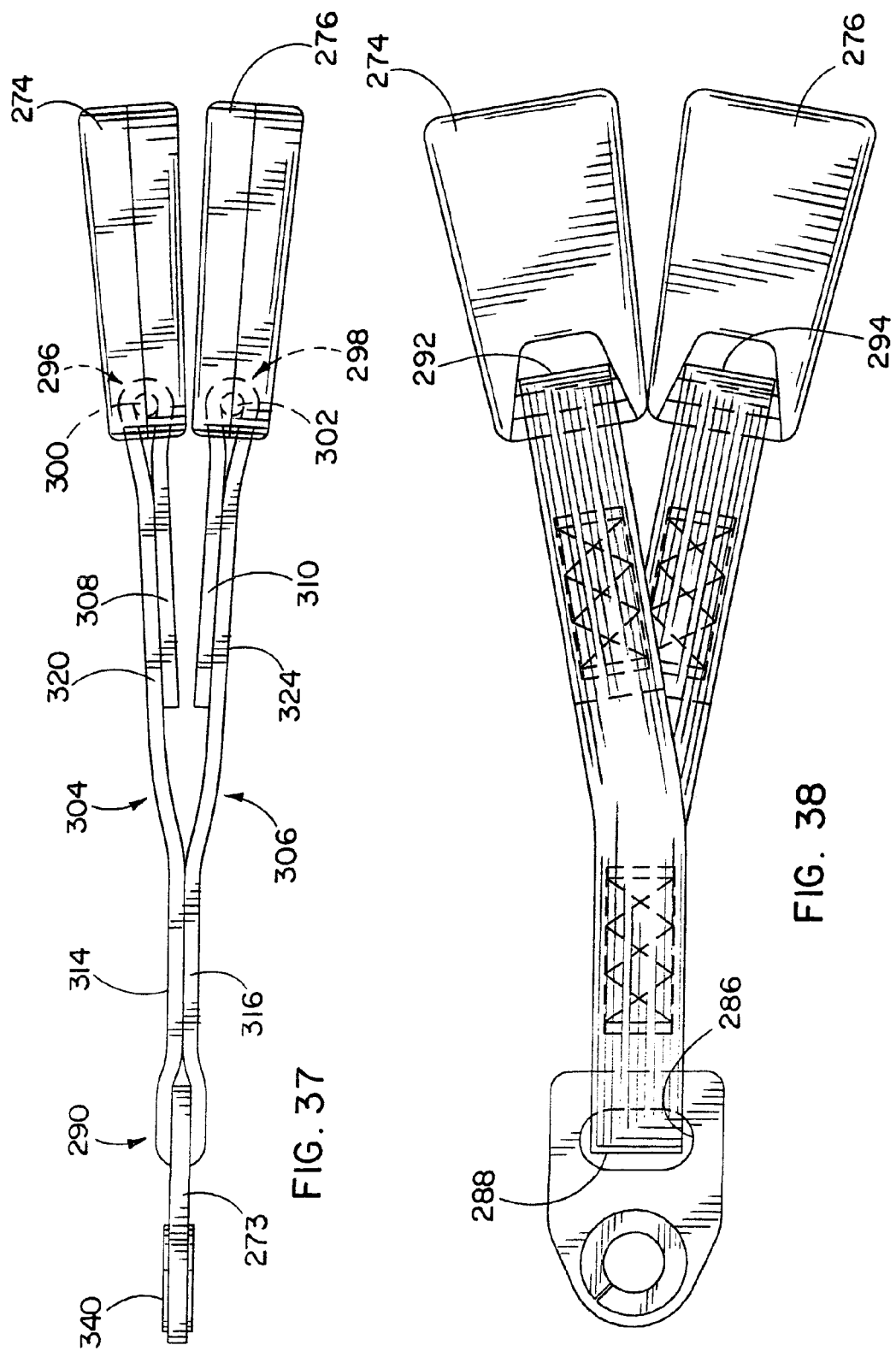

BUCKLE SUPPORT ASSEMBLY AND MANUFACTURING METHOD AND SYSTEM

CROSS-REFERENCE TO RELATED APPLICATIONS

This is a U.S. continuation patent application of prior PCT Application No. PCT/US2006/001174, filed Jan. 12, 2006, which claims priority to U.S. Provisional Application Nos. 60/643,466, filed Jan. 13, 2005, and 60/680,110, filed May 12, 2005. All of these prior applications are hereby incorporated by reference in their entirety.

FIELD OF THE INVENTION

The invention relates to an assembly including and supporting a buckle component to be latched to another buckle component of a seat belt system, and to a method and system for manufacturing the buckle component support assembly.

BACKGROUND OF THE INVENTION

For supporting buckles adjacent a vehicle seat or projecting from between the seat cushion and seat back, various support assemblies have been proposed. In the side mounted buckles, webbing stalks of steel strap material have been employed that are effective in supporting and keeping the buckle in a predetermined position for ease of latching with a tongue plate on a seat belt such as in a common three-point seat belt system. In other words, because of the high strength and stiffness of the steel strap, the buckle is substantially rigidly held in position in the area between the seat cushion and seat back or, more typically such as with front bucket seats, adjacent the seat such that a passenger need not hold the buckle housing while inserting the tongue plate therein for buckling or latching operations to occur. However, the downside of such a rigid mounting of the buckle is that should a passenger accidentally start to sit in the area of the buckle, they will feel a very uncomfortable and possibly painful hard, projecting part of the seat belt system. Because there is very little give in the steel buckle positioning strap, the passenger will likely have to get back up for completely repositioning themselves on the vehicle seat.

The use of seat belt webbing material for the buckle supporting stalk is also known. However, the belt webbing buckle anchoring assemblies are more commonly used to extend between the seat backs and seat cushions of vehicle seats such as in a rear bench seating arrangement of a vehicle. In this instance, the webbing does not really support the buckle as instead its weight rests on the seat cushion. Such buckle mounting straps are advantageous in that they do not present a rigid and hard obstacle to a passenger attempting to position themselves for sitting on a vehicle seat due to the flexible nature of the seat belt webbing material. On the other hand, belt webbing buckle positioning members typically require that the passenger hold the buckle to orient the slot opening thereof in an upwardly facing direction for sliding receipt of the tongue plate therein. Thus, these flexible webbing positioning members will generally require a two-handed buckling operation. Further, these webbing buckle mounts generally are not sufficiently stiff for use as a self-supporting buckle stalk to properly position the buckle alongside the seat cushion without incorporating an additional reinforcement member to the assembly.

U.S. Pat. No. 4,645,231 to Takada is directed to a seat belt buckle stalk that employs a seat belt webbing and recognizes the above-noted problem with such seat belt webbing stalks. To solve this problem, the '231 patent teaches folding belt webbing and then placing it in a mold. Plastic is injected into the mold to fill in the gaps between the folded webbing portions to provide it with the stiffness needed to be self-supporting with a buckle attached to the end opposite the anchor. Utilizing a molded plastic material between folded seat belt webbing portions, while generally providing a slight cushioning around the hard plastic material between these folded portions, still creates a rigidity problem. And while possibly more flexible than a steel strap based stalk, the webbing and molded plastic stalk of the '231 patent still will present a relatively rigid mounting of the buckle. Again, while this is beneficial for the buckle latching operation, the rigid stalk creates an impediment for comfortable seating of passengers on the vehicle seats. Further, the manufacture of the '231 patent stalk is relatively complex in requiring a special mold and plastic injection molding operations undesirably increasing costs associated therewith.

Accordingly, there is a need for a positioning member for a buckle component that provides for an optimal combination of stiffness to allow the buckle to stay in a predetermined position and of allowing for shifting of the buckle component upon application of bending forces thereto. More specifically, a buckle component positioning member is desired that allows for one handed buckling operations to occur but does not create a significant impediment to passengers when attempting to positioning themselves for seating on a vehicle seat with which the buckle component is associated.

SUMMARY OF THE INVENTION

In accordance with one aspect of the present invention, a buckle component support assembly is provided that includes a buckle component and a positioning member that substantially supports the component in a predetermined elevated position for latching with another buckle component. The support assembly further includes a flexible material of the positioning member that is arranged and configured to provide the positioning member with a predetermined stiffness that substantially maintains the buckle in the predetermined elevated position during latching. In this manner, the positioning member allows for one handed latching operations to occur as the vehicle passenger does not have to grip and then position or orient the buckle component for latching with the other buckle component. Further, the arrangement and configuration of the positioning member flexible material is such that the positioning member is provided with a predetermined amount of resilient shifting by application of a relatively low bending force thereto. In this manner, a vehicle passenger is able to seat themselves on the vehicle seat without fear that a substantially rigidly held and hard seat belt buckle component will get in the way such as occurs with steel strap stalks, as previously discussed. Accordingly, the present positioning member has a predetermined stiffness that provides an optimum balance between the support strength the positioning member provides for keeping the buckle component supported in a predetermined elevated position and bend resistance to allow for the buckle component to readily shift such as when a relatively low, transverse bending force is applied to the positioning member, which can occur when a passenger inadvertently engages the buckle component and/or positioning member as they are moving to sit on the vehicle seat.

In a preferred form, the predetermined flexible material is the sole buckle component supporting material of the positioning member. Even more preferably, the material is belt webbing material that includes fold portions arranged and attached so that the positioning member is self supporting and allows for the resilient shifting of the buckle component.

In an alternative form, a cover or sleeve may be provided to extend about the positioning member for aesthetic purposes. Optionally, the sleeve may serve as a retainer to keep the buckle component properly oriented for a tongue latching operation with the flexible material of the positioning member still providing the primary support for the buckle component that keeps it at its elevated position.

In one form, a standard width belt webbing is folded along at least one longitudinal fold line to form an initial double-thickness, half-width, belt webbing length. Three fold portions are then formed by folding the initial half width belt webbing length over a pair of longitudinally spaced and transversely extending fold lines. This allows the three-fold portions to be attached to provide the positioning member with a thickness six times that of the belt webbing material.

In another aspect, it has been found that the sew pattern employed is of significance in terms of being able to form the positioning member with the necessary tensile strength while keeping the frequency of needle breakage relative to the number of positioning members sewn therewith to a minimum. In a preferred form where the flexible material of the positioning member is belt webbing material that is folded and attached to have a thickness at least three times the thickness of the belt webbing material, a predetermined sew pattern is provided that minimizes the number of stitches needed to sew the folded belt webbing material together for forming the positioning member while still providing the positioning member with a predetermined high tensile strength, for example, comparable to that provided by steel strap buckle stalks.

In order to optimize the stiffness in terms of the amount of resilient shifting allowed by the positioning member, it has been found that it is preferred to have the positioning member stiffness provide for the low bend force to be in the range of approximately 1 N to less than approximately 10 N to resiliently shift the positioning member between approximately 10 mm to approximately 30 mm from the predetermined elevated position. In another form, the predetermined stiffness provides for the low bending force to progressively increase as the buckle component shifts progressively further away from the predetermined elevated position. Accordingly, the stiffness is akin to that of steel strap stalks in terms of the tensile strength component thereof herein, whereas the stiffness in terms of the bend resistance as measured by the bend force for the positioning member is generally one order of magnitude lower than those required for bending comparable steel stalks.

Other aspects of the invention include a folding and sewing system for forming a buckle component positioning member of flexible material, and a method for forming such a positioning member. In particular, the folding and sewing system includes a pair of folding fixtures for folding the flexible material of the positioning member, and a clamping fixture for holding the folded material during sewing thereof.

The method includes folding the flexible material along at least one longitudinal fold line and sewing the folded material together for forming an initial, double-thickness, half-width stock of folded material. The method further includes transversely folding the initial stock of folded material over a lateral fold line and sewing the folded-over stock of folded material together to form the positioning member with a shortened length and increased thickness over that of the initial stock of folded material. Preferably, the initial stock of transversely folded material is transversely folded again over a second lateral fold line that is longitudinally spaced from the first lateral fold line to extend over and along the transversely folded material and be sewn thereto to form the positioning member.

In a preferred form, the sewing of the transversely folded material includes sewing at least a criss-cross pattern therethrough. Even more preferably, the sewing of at least the criss-cross pattern includes sewing both the criss-cross pattern and a box pattern to extend substantially continuously along a majority of the length of the positioning member.

BRIEF DESCRIPTION OF THE DRAWINGS

FIG. 7 is a perspective view of another buckle support assembly similar to the buckle support assemblies of FIGS. 1-6 but not including a switch assembly;

FIG. 8 is a side elevational view of the buckle support assembly of FIG. 7;

FIG. 9 is a plan view of a buckle support assembly showing a stitch pattern for securing the multiple layers of belt webbing material of the positioning member together;

FIG. 10 is an enlarged view of the positioning member of FIG. 9 showing the combination box and butterfly stitch pattern;

FIG. 11 is an enlarged elevational view similar to FIG. 10 showing an alternative stitch pattern including a plurality of butterfly stitch groups spaced along the length of the positioning member;

FIG. 12 is perspective view of a fixture for folding belt webbing material so that the lengthwise edges are folded toward each other;

FIG. 13A is a fragmentary plan view taken along line 13A-13A of FIG. 12 showing the belt webbing material after being folded via the fixture FIG. 12;

FIG. 13B is a fragmentary view similar to FIG. 13A showing the folded webbing material stitched together;

FIG. 19 is a plan view of another buckle support assembly having a flexible, belt webbing positioning member extending between the buckle and anchor plate;

FIG. 20 is an enlarged, fragmentary elevation view of the buckle support assembly of FIG. 19 showing a tri-fold configuration of the positioning member adjacent the buckle;

FIG. 21 is an elevational view of the buckle support assembly of FIG. 19 showing a bi-fold configuration of the positioning member extending from the tri-fold portion to the anchor plate;

FIGS. 22 and 23 are perspective views of the fixture used for forming the positioning member of FIGS. 19-21;

FIG. 24 is a perspective view of the combination bi-fold and tri-fold positioning member connected to the anchor plate generated by the folding operations illustrated in FIGS. 22 and 23;

FIG. 27 shows the tensile strength test results for a steel strap mounted buckle, and the tri-fold positioning members with the two different stitch patterns, and the combination bi-fold and tri-fold positioning member;

FIG. 29 shows the results of various flexibility tests using the test rig of FIG. 28 for the belt webbing positioning members;

FIG. 30 shows the flexibility test results for a steel strap positioning member;

FIG. 35 is a perspective view of the dual buckle support assembly showing the pair of buckles each having a bi-fold portion of the positioning member connected thereto which meet at a lower bi-fold portion connected to the anchor plate;

FIGS. 36-38 are additional views of the dual buckle support assembly; and

DETAILED DESCRIPTION OF THE PREFERRED EMBODIMENTS

Figure 1:
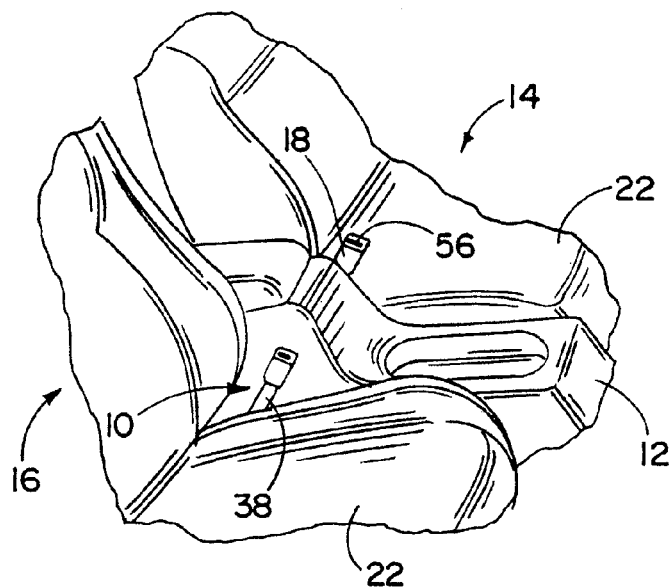
FIG. 1 is a perspective view of driver and passenger seats showing a buckle support assembly adjacent to each of the seats.
Figure 2:
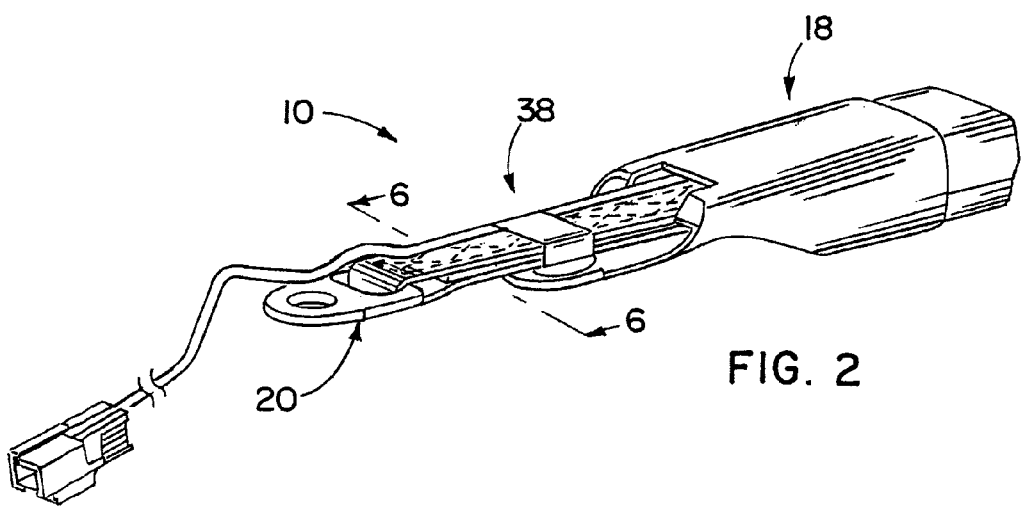
FIG. 2 is a perspective view of the buckle support assembly showing a flexible, belt webbing positioning member extending between the buckle and a lower anchor plate.

FIG. 1 illustrates a pair of buckle support assemblies 10 positioned on either side of a center console 12 between driver and passenger seats 14 and 16, respectively. As can be seen, the support assembly 10 positions a buckle component such as buckle 18 at a elevated position extending upwardly in a direction away from the floor of the vehicle. The support assembly 10 also includes a lower anchor plate 20 as shown in FIG. 2 for being attached to a lower portion of the frame of the seats 14 and 16. Alternatively, the anchor 20 can be adapted to mount to the vehicle frame or vehicle floor. In the preferred and illustrated form, the buckle support assembly 10 positions the buckle 18 so that its elevated position is slightly higher than the seat cushion 22 of each of the seats 14 and 16. In this manner, the buckle support assembly 10 positions the buckle 18 at a convenient, easy-to-reach location for latching with the cooperating buckle component, i.e., tongue plate 24, of a seat belt system, such as the three-point seat belt system 26, shown in FIG. 1A. Manifestly, the tongue plate 24 could be part of the support assembly 10 to be supported thereby instead of the buckle 18.

The three-point belt system 26 is shown for use with the outer seats 28 of a rear bench seat arrangement 30, although it is apparent a similar three-point system 26 could be employed with the driver and passenger seats 14 and 16. In the rear bench seat 30, the buckle support assemblies 10 can also be utilized extending between the seat cushion 32 and seat back 34, and adjacent the center seat 36. In this instance, the support assemblies 10 are also operable to substantially keep the buckles 18 in an elevated position slightly raised over the corresponding seat cushion 32 rather than resting thereon.

Figure 6:
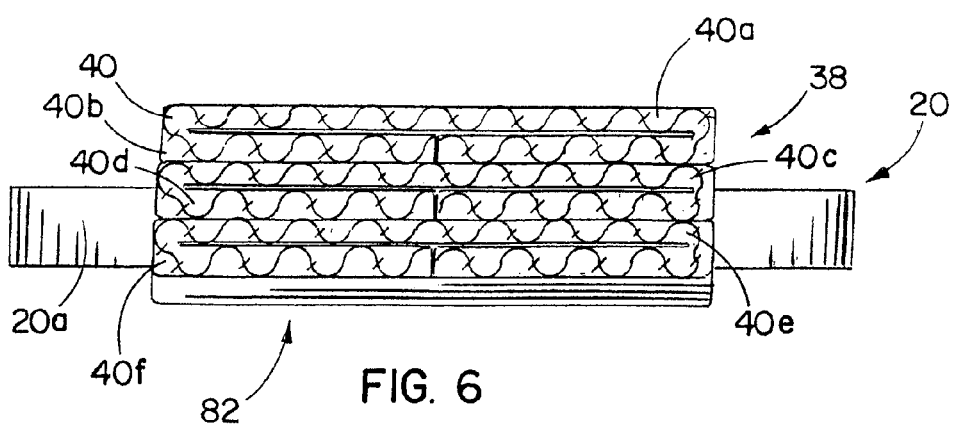
FIG. 6 is a cross-sectional view taken along lines 6-6 of FIG. 2 showing multiple layers of belt webbing material forming the positioning member.

More particularly, the present buckle support assembly 10 has an optimum combination of buckle support strength for keeping the buckle 18 in a substantially predetermined position that allows for easy latching of the tongue plate 24 therein and resilient shifting such as for occurring when a passenger inadvertently contacts the support assembly 10 including buckle 18 or positioning member 38 thereof. For this purpose, the positioning member 38 preferably is exclusively formed of a flexible material such as a fabric belt webbing material 40. As can be seen in FIG. 6, the belt webbing material 40 is folded so that the positioning member 38 has multiple layers of the webbing material 40 attached together as by sewing. This provides the positioning member 38 with the stiffness characteristics previously described. In the preferred form, the positioning member 38 is formed of six layers 40a-40f of belt webbing material so that the thickness of the positioning member 38 is six times that of a single layer of the belt webbing material 40. It has been found that belt webbing material provided by the assignee herein is particularly useful for forming the present positioning member 38, particularly where the layers 40a-40f are sewn together, as will be described in more detail hereinafter.

Figure 1A:
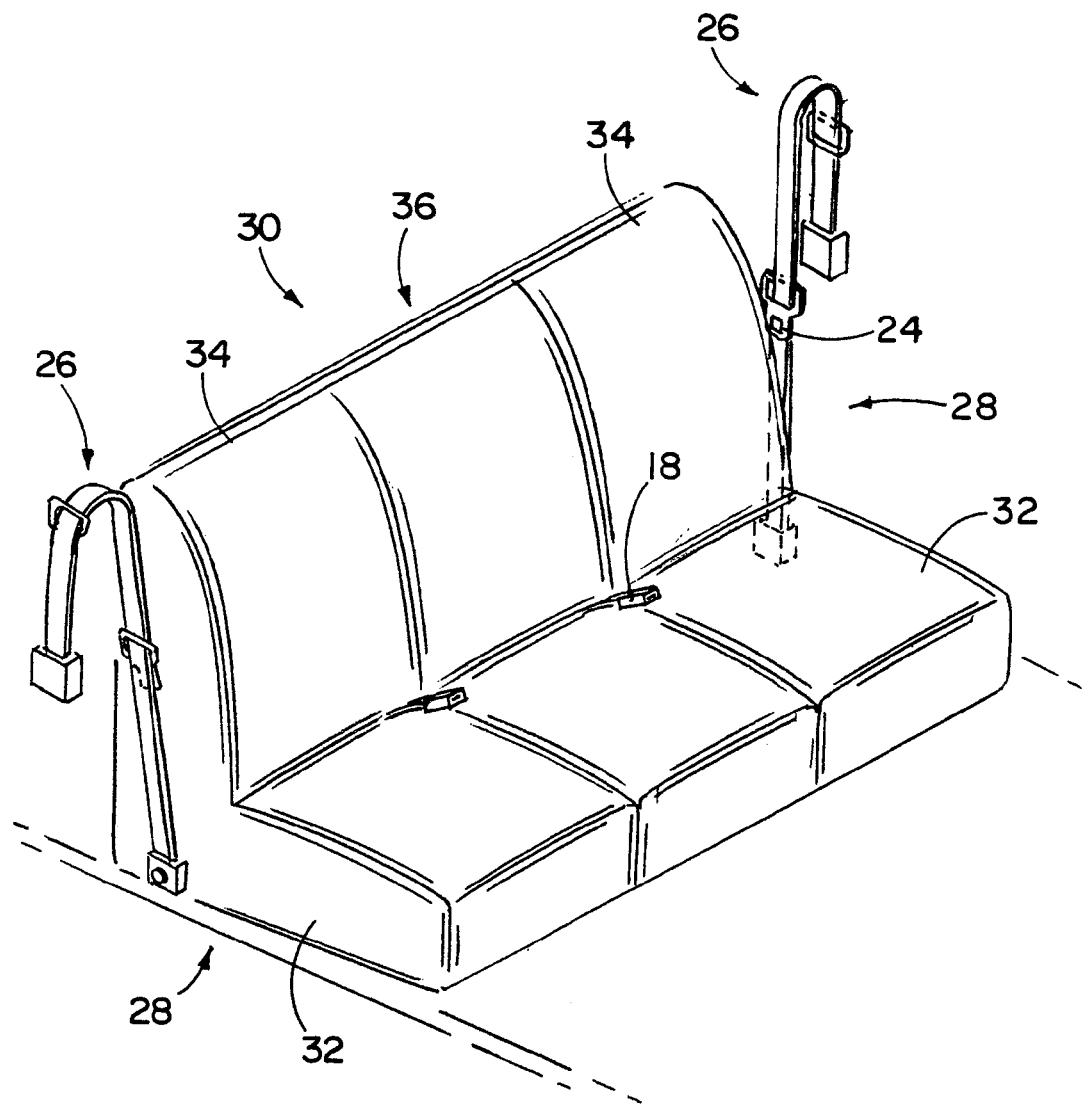
FIG. 1A is a perspective view of a rear bench seat including buckle support assemblies that support respective buckles in an elevated position relative to an adjacent seat cushion.

The preferred positioning member 38 of FIG. 6 avoids the need for separate reinforcing material to provide the desired level of stiffness. Folding the six layers 40a-40f of belt webbing material 40 together provides the positioning member 40 with sufficient strength and stiffness to be self supporting including the weight of the buckle 18 at one end thereof, as can be seen in FIGS. 1 and 1A. At the same time, the stiffness and strength, particularly the tensile strength along the longitudinal direction of the elongate buckle positioning member 38 is not so great as to keep from allowing a relatively low transverse bending force applied to the buckle support assembly 10 to cause shifting of the buckle 18 or positioning member 38. In this fashion, the positioning member 38 is both operable to keep the buckle 18 substantially in its predetermined elevated position during buckling operations and to allow inadvertent contact with the support assembly 10 such as when a passenger is attempting to seat themselves to cause the shifting or deflection of the support assembly 10.

Thus, the present positioning member 38 allows a passenger to perform a one-handed latching operation by simply using one hand to grab the tongue plate 24 while inserting it in the elevated buckle 18 for latching therewith out the need to use their other hand to orient and position the buckle 18 for sliding receipt of the tongue plate 24 therein. Nevertheless, when a person is sitting down and happens to accidentally sit in the area of the support assembly 10, they will not impact against a hard and rigidly held object such as with prior steel strap, buckle supporting stalks. Instead, the multi-layered positioning member 38 allows for a predetermined amount of resilient shifting of the support assembly 10 upon application of a bending force to the support assembly 10 that is generally transverse to the length of the positioning member 38. Accordingly, with the present positioning member 38, the passenger will not experience significant discomfort and/or pain if they accidentally hit the support assembly 10 such as when they are orienting themselves for sitting on the vehicle seats 14, 16 and 28. In fact, the tensile strength of the positioning member 38 is comparable to that provided by steel strap stalks (FIG. 27), while still allowing for much lower bending forces to shift the support assembly 10 versus those required for shifting the steel strap stalk (FIGS. 29 and 30).

FIGS. 2-5 and FIGS. 7 and 8 show examples of two different support assemblies 10, one with electronics that transmits a latched or unlatched signal to a dash board light (FIGS. 2-5), and the other without such electronics (FIGS. 7 and 8). In both instances, the support assemblies 10 utilize the same positioning member 38. It is anticipated that the electronically-enabled support assembly of FIGS. 2-5 could be used with the driver seat 14 while the other support assembly 10 of FIGS. 7 and 8 could be used with the passenger seat 16. Alternatively, these support assemblies 10 could be reversed in terms of which seat they are used with, or the electronically-enabled, support assembly 10 could be used with both seats 14 and 16 and likewise the non-electronically enabled, support assembly 10 could be used with both seats 14 and 16.

Figure 3:
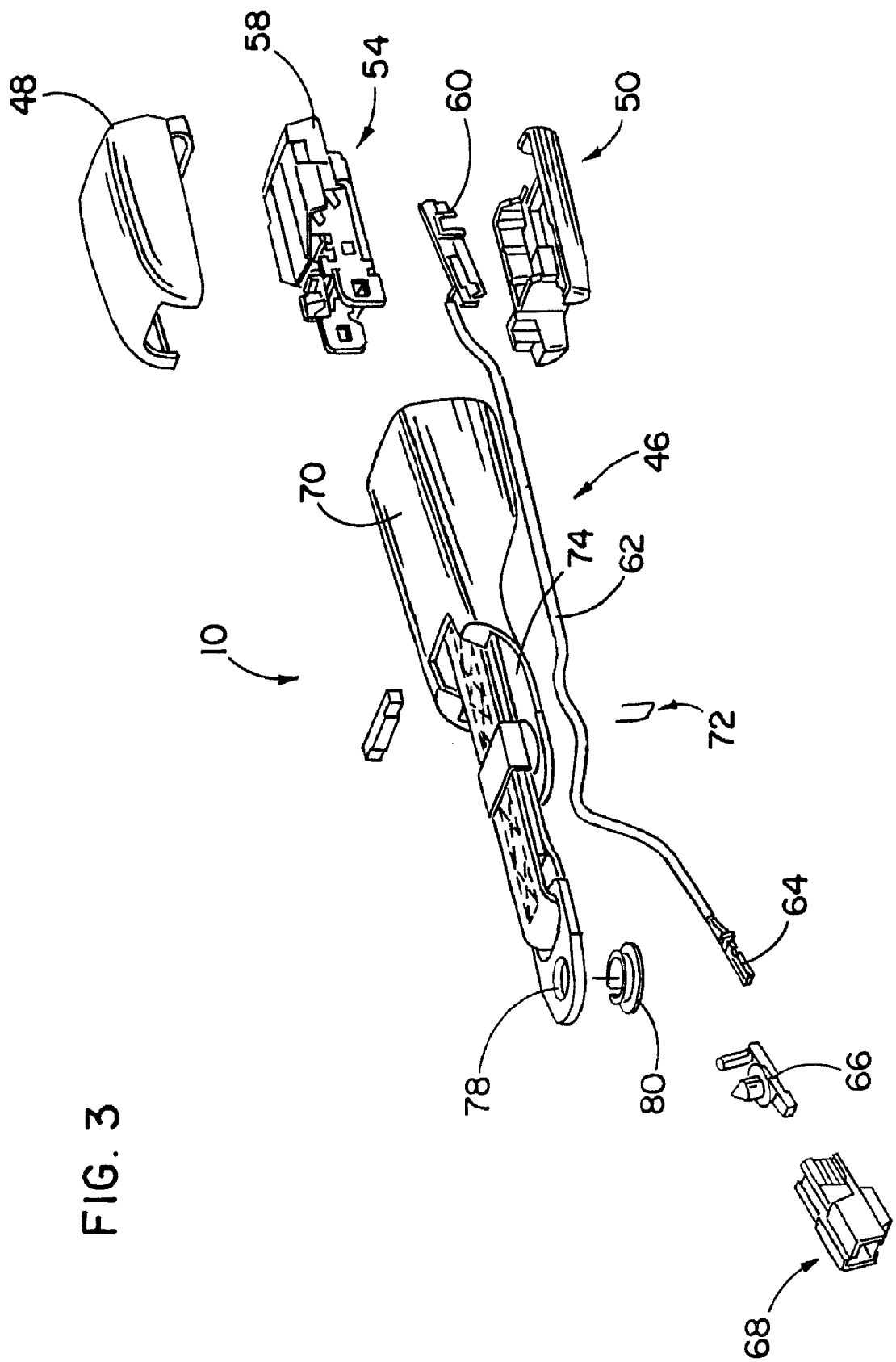
FIG. 3 is an exploded view of the buckle support assembly showing a sleeve member fixed to the belt webbing positioning member, and a switch assembly for sensing latching of a tongue plate in the buckle.
Figure 4:
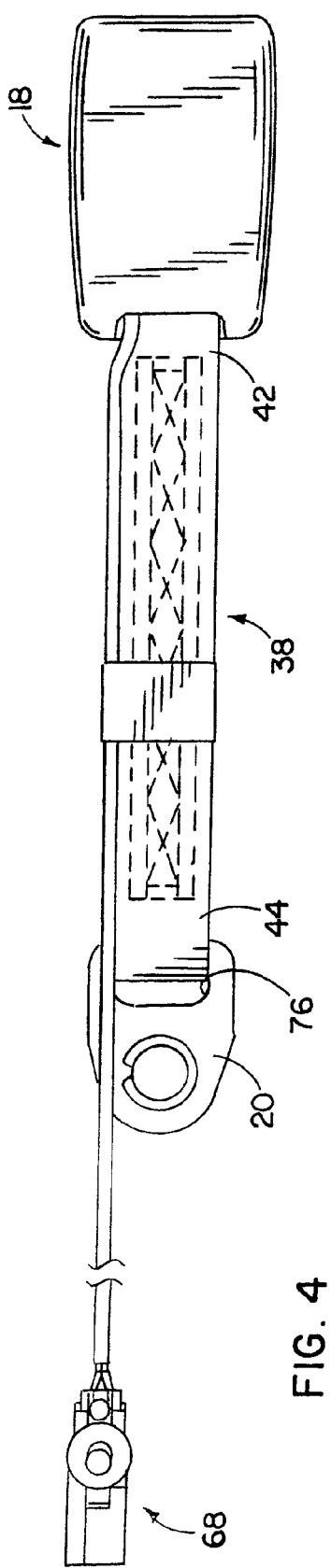
FIG. 4 is a plan view of the buckle support assembly without the sleeve member.
Figure 5:
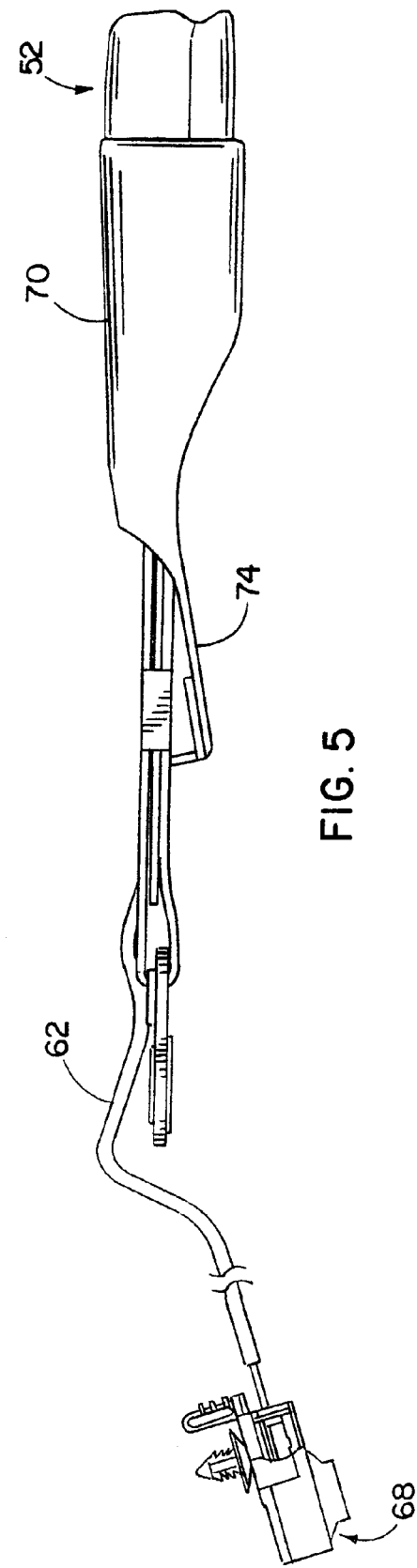
FIG. 5 is a side elevational view of the buckle support assembly including the sleeve member.

The positioning member 38 generally will have a length greater than its width with the length extending between opposite ends 42 and 44 of the positioning member 38. Referring to FIG. 4, the buckle 18 is attached to the positioning member 38 at the upper end 42 thereof while the anchor plate 20 is attached to the positioning member 38 at the lower end 44 thereof. FIG. 3 illustrates the switch assembly 46 as incorporated with the buckle support assembly 10 of FIGS. 2-5. The buckle 18 includes a cover member 48 and a base member 50 that are attached together to form housing 52 for buckle operating subassembly 54. As is known, the buckle housing 52 defines a slot opening 56 with the tongue plate 24 configured for being slidingly inserted therein. Once the tongue plate 24 has slid a sufficient distance in the buckle 18, it will be latched in the housing 52 via the operating mechanism 54. To release the tongue plate 24 from the buckle 18, push button actuator 58 of the mechanism 54 is depressed releasing the latching connection between the tongue plate 24 and the operating mechanism 54 and allowing the passenger to pull the tongue plate 24 out from the buckle 18.

The switch assembly 46 includes a switch device 58 that is disposed in the buckle housing 52 and adapted to sense whether the tongue plate 24 is latched by the operating mechanism 54. Lead wires run through a sheath or tube 62 out from the rear of the buckle housing 52 to a terminal 64 that is connected to a connector clip 66 which, in turn, is connected to electrical connector 68. The connector 68 fits into a wire harness disposed behind the seat 14 which is electrically connected to the dash board light for indicating whether the driver seat buckle 18 is in its unlatched or latched condition with the tongue plate 24.

In all other respects, the construction of the electronically-enabled, support assembly 10 of FIGS. 2-5 and the other support assembly 10 of FIGS. 7 and 8 is substantially the same. Accordingly, there is a protective sleeve member 70 into which the rear of the buckle housing 52 is tightly received. The sleeve member 70 is optional for aesthetic purposes, and can also serve to retain the buckle 18 against pivoting relative to the positioning member 38 so that the slot opening 56 stays in a generally upward facing orientation for ease of inserting the tongue plate 24 therein. A staple 72 secures the sleeve member 70 against sliding relative to the positioning member 38 as it is driven through a thin, lip extension portion 74 of the sleeve member 70 that projects downwardly along the positioning member 38, and then into the belt webbing material 40 of the positioning member 38. The anchor plate 20 has an upper slot opening 76 for attaching to the positioning member end 44, as will be described hereinafter. A lower annular opening 78 is also formed in the anchor plate 20 for receipt of a bushing 80 therein. The lower anchor opening 78 and bushing 80 allow the anchor plate 20 to be fastened to a lower portion of the seat frame via an anchor bolt with the bushing 80 acting as a noise dampener between the bolt and anchor plate 20.

Turning next to a description of the formation of the preferred positioning member 38 including the six layers 40a-40f of belt webbing material 40, reference will be had to FIGS. 12-18. As previously mentioned, body 82 of the positioning member 38 is preferably composed of several layers 40a-40f of belt webbing material 40 formed from a standard size of belt webbing 83, such as the belt webbing provided by the assignee herein. By way of example and not limitation, the belt webbing can have a thickness of approximately 9 mm to approximately 14 mm, and a width of approximately 22 mm to approximately 28 mm extending between opposite side edges 84 and 86 thereof. This standard size belt webbing 83 is taken through folding stations 80a and 90 and sewing station 92 for forming the multilayered body 82 of the positioning member 38.

Referring specifically to FIG. 12, the belt webbing 83 is initially run through fixture 94 for reducing the width of the webbing 83. More particularly, the fixture is in the form of a shoe member 96 having enlarged mouth opening 98 at its infeed end. The shoe member 96 tapers from the mouth opening 98 to a smaller exit opening 100 at its opposite end via contoured side walls 102 and 104. The contour of the side walls 102 and 104 is such that as the webbing 83 is drawn through the shoe member 96 in travel direction 105 along the length of the webbing, either automatically or manually, the edges 84 and 86 are folded over and toward one another. With the edges 84 and 86 folded so that they are in closely spaced or abutting relation as shown in FIG. 13A, the folded webbing 83 is then stitched as shown in FIG. 13B.

Accordingly, after the webbing 83 has been folded at the folding station 88 and sewn at a sewing station (not shown), the folded webbing 83 will have a width dimension between folded side edges 106 and 108 that is approximately half that of the unfolded belt webbing 83 between edges 84 and 86 thereof. In addition, the folded webbing portions 110 and 112 including the respective webbing edges 84 and 86 are approximately one-quarter the width of the unfolded belt webbing 83 as folded about longitudinal fold lines 107 and 109 corresponding to the respective folded side edges 106 and 108. The quarter-width, webbing portions 110 and 112 are folded back onto a half-width, central portion 114 of the webbing 83 so that there is now a double-thickness of webbing material 40 once the webbing portions 110 and 112 are sewn to the central webbing portion 114. Referring to FIG. 13B, it can be seen that stitches 116 extend in the longitudinal direction 118 of the webbing 83 with the stitches 116 oriented in rows 120 and 122 adjacent and substantially parallel to respective edges 84 and 86. Accordingly, the stitch row 120 attaches the quarter-width belt webbing fold portion 110 to the half-width, central webbing portion 114, and the stitch row 122 attaches the quarter-width, folded webbing portion 112 to the central webbing portion 114. In this manner, the webbing 83 is transformed to a double-thickness, half-width run of webbing that is utilized to form the multi-layered, positioning member body 82.

It should be noted that since the stitches 116 only attach two layers of the belt webbing material 40 together, standard belt webbing sewing equipment (not shown) can be utilized. Further, while the webbing 83 is preferably folded along the two fold lines 107 and 108 to avoid exposing the webbing edges 84 and 86 along the side of the double-thickness, half-width piece formed at folding station 88, it should be apparent that the webbing 83 could be folded instead along a single, central, longitudinal fold line to form the double-thickness, half-width piece of belt webbing.

Figure 14:
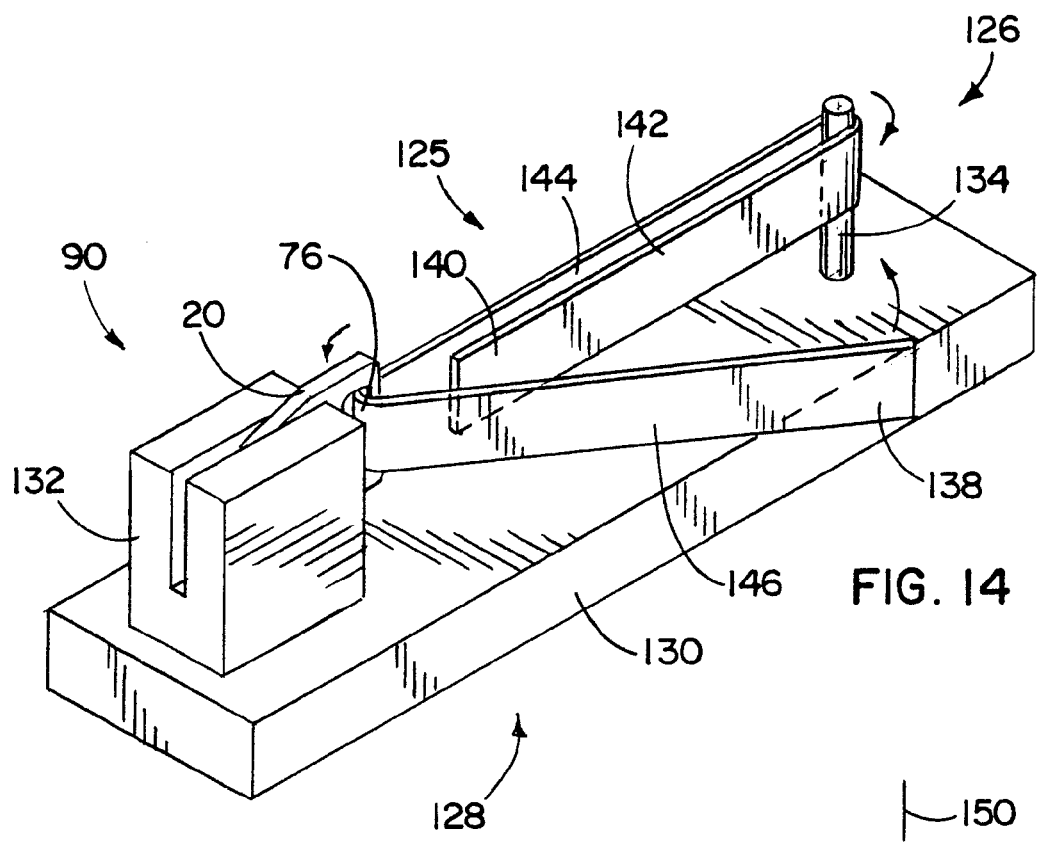
FIGS. 14-18 show a stock member of double-thickness, half-width webbing material of FIG. 13B folded, connected to the anchor plate, and stitched to form the positioning member having a double-thickness, tri-fold configuration.
Figure 15:
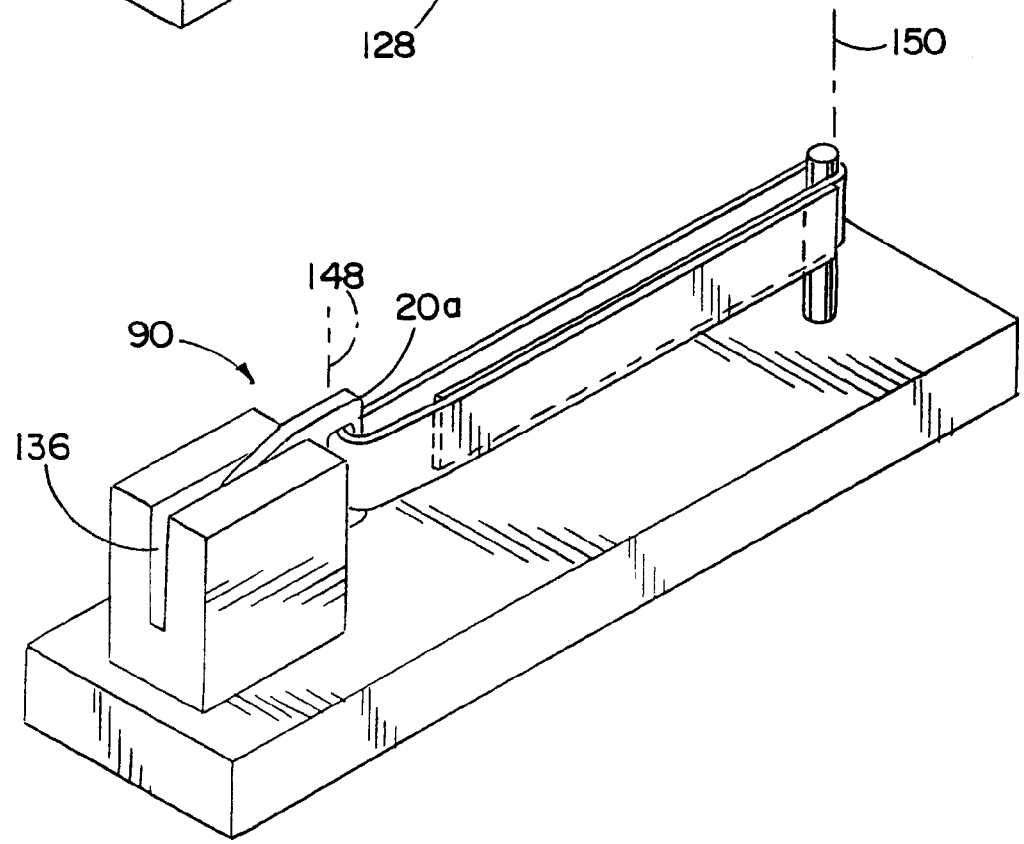

After folding and stitching as described above, the sewn and folded belt webbing 83 is cut to specific lengths at a cutting station (not shown) for the final folding and stitching operations for forming the positioning member 38. Referring to FIGS. 14 and 15, the cut-to-length folded webbing material provides an initial webbing stock piece or member 125 of a predetermined length of double-thickness, half-width webbing material 40 that is again folded at folding station 126. The folding station 126 includes a fixture 128 having a base 130 with an anchor holding block 132 and a folding post 134 at either end thereof. The block 132 has a narrow slot 136 that extends centrally and vertically through the block member 132 and is open to the top thereof. The narrow slot 136 has a width close to that of the thickness of the anchor plate 20 such that the anchor plate can be slid from the top of the block 132 into the slot 136 and be received with a snug fit therein.

As mentioned, the stock 124 is cut to a predetermined length to form a stock member 125 that extends between opposite ends 138 and 140 thereof. With the anchor plate 20 substantially rigidly held in the fixture block 132, the stock end 138 is laced through the anchor plate slot opening 76 and pulled therethrough until stock end 140 is disposed at a desired distance from the fixture post 134. More particularly, the stock end 140 is pivoted around the post 134 so that stock portion 142 extends closely adjacent to stock portion 144 that is drawn to extend tautly between the anchor plate 20 and the post 134. The stock portion 146 including end 138 is drawn through the anchor plate slot 76 and pivoted around the plate back toward the stock portions 142 and 144. The length of the stock portion 146 is dictated by how far the stock member 125 is drawn through the anchor slot 76. Generally, it is desired for the length of the stock portion 146 to be approximately the same as that of stock portion 144 so as to extend between the slot opening 76 in the anchor plate 20 and the fixture post 134, as shown in FIG. 15. This positions the stock end 140 at a predetermined distance, e.g. in the range of approximately 2 mm to approximately 5 mm, from the adjacent end 20*a* of the anchor plate 20.

After the end 138 is pivoted into engagement with the stock portion 144, the transversely folded stock member 125 is removed from the fixture 128 by lifting the anchor plate 20 out of the retaining slot 136 of fixture block 132 and the folded stock portions 142 and 144 off of the fixture post 134. The folded stock member 125 has the shorter length, inner stock portion 142 extending between the longer length, outer stock portions 144 and 146 so that there are three layers of the double-thickness, half-width stock 124 of belt webbing material 40. Accordingly, it can be seen that the stock member 125 is transversely folded along two lateral fold lines 148 and 150 extending widthwise along the stock member 125 between the folded, side edges 106 and 108 thereof and spaced lengthwise from each other along the length of the stock member 125 in the longitudinal direction 118. The lengthwise or longitudinal spacing of the fold lines 148 and 150 defines the length of the positioning member 38 which substantially coincides with the distance between the anchor plate slot 76 and the distal surface portion of the fixture post 134 about which the stock member 125 extends.

With the positioning member 38 formed as described above, the folded stock member 125 provides the positioning member body 82 with a double thickness, trifold configuration in that there are three fold portions 142-146 of the stock member 125 each being formed from the initial, double thickness, half width length of folded stock 124, as previously described. In other words, each of the folded stock portions 142-146 includes the folded webbing portions 110 and 112 and the central webbing portion 114 so that the double-thickness, trifold configuration of the positioning member body 82 provides it with the six layers 40*a*-40*f* of belt webbing material 40, as shown in FIG. 6.

Because of the number of tough fabric layers that the positioning member 38 is formed with as described above, it has been found that the particular sewing process and pattern is of significance. In particular, the preferred stitch patterns minimize the number of discrete stitches that are necessary to hold the stock portions 142-146 together while still providing for the high tensile strength that is desired for the positioning member 38. In addition, the preferred stitch patterns also assist in providing the positioning member 38 with the desired level of bend resistance so that the buckle 18 is held substantially stationery during buckling operations while permitting it to readily shift when accidentally engaged by a passenger, as has previously been described.

To enable the positioning member to have the optimized stiffness as described above, it is preferred that the webbing 83 be obtained from applicant's assignee herein, as previously mentioned. The fabric webbing 83 has its grain 152 running substantially longitudinally along the positioning member 38 in the direction of its longitudinal axis 38*a*, as seen best in FIGS. 9-11. Accordingly, it is the construction of the webbing 83, the folding of the webbing 83 to form the positioning member body 82, and the sewing of the folded webbing body 82 with a predetermined sew pattern such as sew pattern 154 of FIGS. 9 and 10 and sew pattern 156 of FIG. 11 that together cooperate to provide the positioning member 38 with the stiffness described herein.

Figure 17:
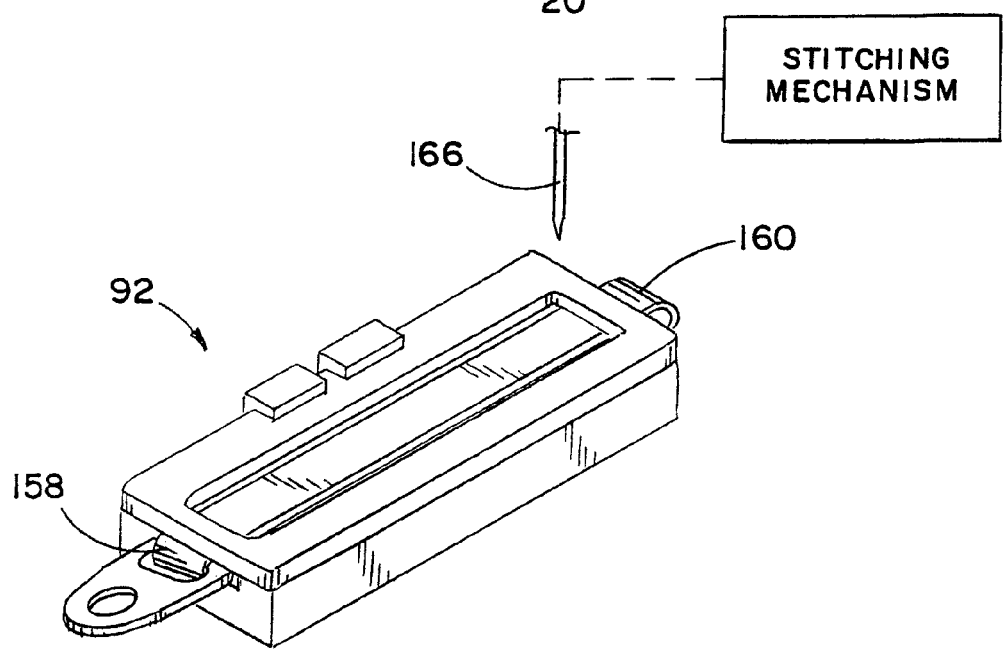
Figure 18:
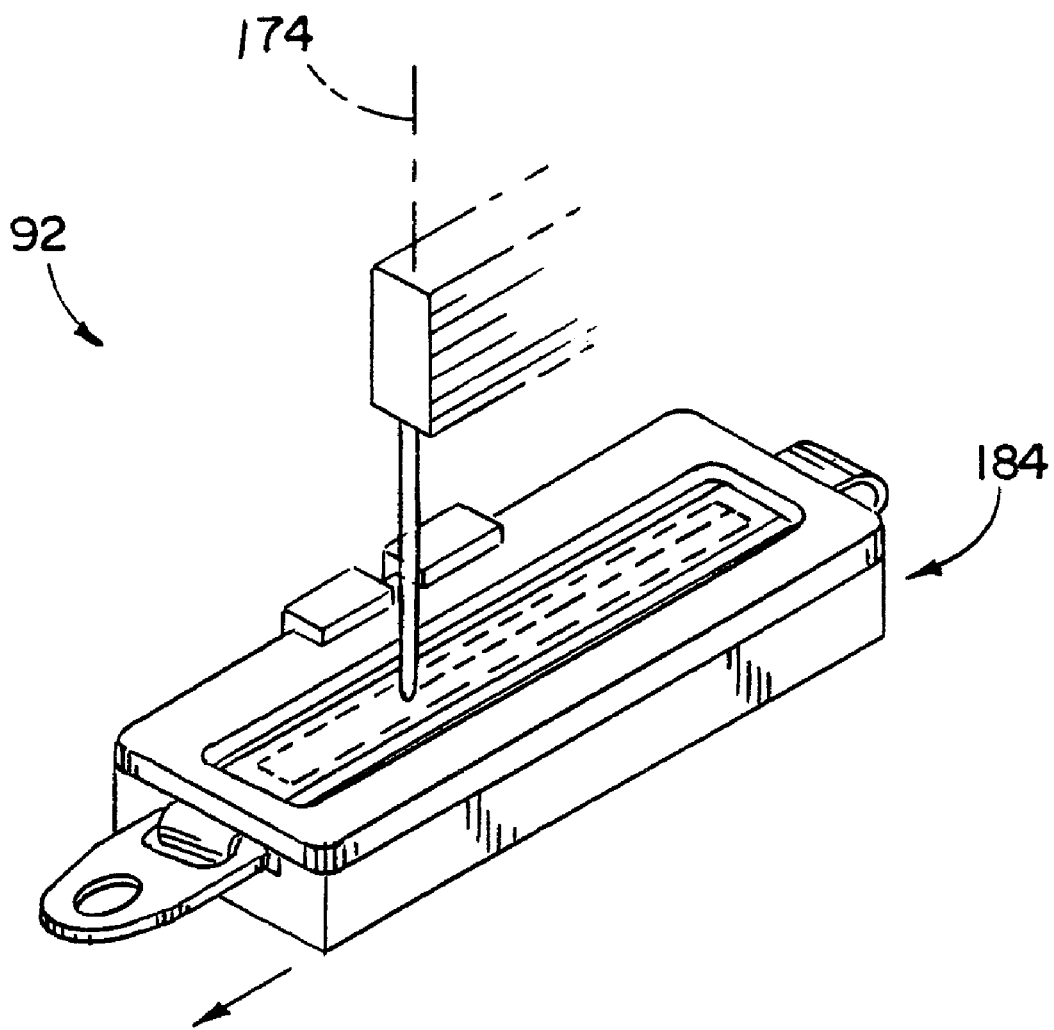

As can be seen in FIGS. 9 and 10, the stitch pattern 154 extends for the majority of the length of the positioning member body between the anchor end 158 and the buckle end 160 at which the transverse folds 148 and 150, respectively are formed. The sew pattern 154 is a combination box and butterfly or cris-cross pattern so that there are a plurality of cris-cross or x-shaped stitch sections 162 each formed by a pair of intersecting stitch rows 163 that are circumscribed by an elongated, rectangular box of stitches 164. With the combination box and butterfly stitch pattern 154, the generally longitudinally directed stitching minimizes the number of discrete stitches that are required while still allowing the stitches to assist in providing the desired high level of tensile strength for the positioning member and also keeping the buckle 18 securely supported in an elevated position for buckling operations. At the same time, the stitching is not so frequent that there is undue resistance to transverse bending of the positioning member 38, and particularly the folded webbing body 82 thereof, and also minimizes the instances of needle breakage per number of positioning members 38 formed therewith. This is of particular concern where as here the preferred positioning member body 82 is formed of six layers 40*a*-40*f* of tough, fabric webbing material 40. Other adaptations of the sewing equipment beyond the particular sew pattern employed are preferably included such as via the provision of a robust, high strength sewing needle 66, as shown in FIGS. 17 and 18.

In the preferred and illustrated form, the stitch pattern 154 also includes a larger outer, rectangular box of stitches 168 that extends about the inner box of stitches 164. Referring to FIG. 10, the box-in-a-box stitch pattern provides for four stitch rows 170 extending in the longitudinal direction along the positioning member 38. These long rows 170 provide the positioning member 38 with tensile strength and resiliency with resistance to undue transverse bending. In addition, the box-in-a-box pattern has four relatively short rows 172 of stitching extending laterally or in the widthwise direction generally orthogonal to the longitudinal axis 38a of the positioning member 38.

More particularly, the inner stitch box 164 is formed from the inner pair of longitudinal stitch rows 170b and 170c which are interconnected at their opposite ends by the lateral stitch rows 172b and 172c. The outer stitch box 168 is formed from the outer, longitudinal stitch rows 170a and 170d interconnected by the lateral stitch row 172a and, toward the anchor end 158 by two closely, spaced lateral stitch rows 172d and 172e. As can be seen, with the inner stitch box 164 generally centered in the outer stitch box 168, the inner, lateral stitch rows 172b and 172c are shorter than the outer, longer, lateral stitch rows 172a, 172d, and 172e, which then extend laterally beyond either end of the adjacent short, lateral stitch rows 172b and 172c. Similarly, the inner, longitudinal stitch rows 170b and 170c are shorter than the outer, longer, longitudinal stitch rows 170a and 170d, which then extend longitudinally beyond either end of the adjacent shorter longitudinal stitch rows 170b and 170c. The two stitch rows 172d and 172e are provided to enable the stitch pattern 154 including the inner X-sections 162 to be substantially, continuously sewn without having to stop stitching to move the needle head 174 across the surface of the positioning member 38 without stitching. The shorter, lateral stitch rows 172 also provide the positioning member with the resistance to bending or twisting about the longitudinal axis 38a of the positioning member 38.

Referring to FIGS. 9 and 10, it can be seen that preferably there are six criss-cross stitch sections 162 bounded by the inner stitch box 164. These sections 162 have an X-shape that is elongated in the longitudinal direction. In this manner, the stitches of the criss-cross sections 162 extend more longitudinally than laterally as they run from one of the longitudinal stitch rows 170b and 170c to the other. To this end, the rows 163 of stitching that make up the interior criss-cross sections 162 extend at an oblique angle of approximately 20° with respect to the longitudinal stitch lines 170b and 170c and the positioning member axis 38a. Thus, the stitch rows 163 extend for a greater extent longitudinally than they do laterally across the width of the positioning member 38. In this way, the stitch rows 163 that extend obliquely between the longitudinal stitch lines 170b and 170c provide additional tensile strength to the positioning member 38 while keeping the number of stitches in the pattern 154 to a minimum.

By way of example, with the preferred belt webbing sizes as has been previously been described, the sew pattern 154 has a longitudinal stitch rows 170a and 170d that extend for a longitudinal distance between lateral stitch rows 172a and 172d for a distance of approximately 139 mm, and the lateral stitch rows 172a and 172d extend for a distance of approximately 16 mm. With respect to the inner stitch box 164, the longitudinal stitch rows 170b and 170c extend for a distance approximately 132 mm, and the lateral stitch rows 172b and 172c extend for a lateral distance of approximately 8 mm. The criss-cross stitch sections 162 each extend for a longitudinal distance of approximately 22 mm along positioning member axis 38a. Accordingly, six such criss-cross sections 162 are provided in the inner stitch box 164.

FIG. 11 illustrates the alternative stitch pattern 156 utilizing a plurality of butterfly or criss-cross stitch groups 176 along the length of the positioning member 38. As can be seen, the criss-cross or X-shaped stitch sections 177 in each of the stitch groups 176 are elongated in the lateral or widthwise direction of the positioning member 38. In this manner, the obliquely extending stitch rows 178 extend for a greater extent laterally than they do longitudinally. To minimize the number of discrete stitches in the stitch pattern 156, the X-shaped sections 177 are preferably disposed in three groups 176 with the intermediate group 176a spaced from the end groups 176b and 176c by gaps 180. Nevertheless, it can be seen that the stitch pattern 156 is less favored than the stitch pattern 154 as it has a greater number of discrete stitches than that used for the combination box and butterfly sew pattern 154.

Even so, it has been found that by utilizing the butterfly stitch sections 177 and spacing them in discrete groups 176, the number of stitches utilized in the pattern 156 is significantly decreased over that which would be required if only lateral stitch rows were utilized, for instance. In this case, the number of stitches needed if only lateral stitch rows were to be employed in terms of providing the positioning member with the desired level of stiffness for tensile strength and bend resistance purposes would be so great that the frequency of needle breakage would be unsatisfactory from a manufacturing standpoint. Accordingly, the preferred sew patterns 154 and 156 employ butterfly or criss-cross stitch sections 162 or 177 to keep the number of discrete stitches for the positioning member 38 to a minimum, with the combination box and butterfly sew pattern 154 illustrated in FIGS. 9 and 10 preferred for this purpose.

Each of the criss-cross stitch groups 176 is completed at their opposite longitudinal ends by a lateral row 182 of stitches so that within a group 176 the stitching can occur continuously before the needle head 174 stops stitching to move to the start point for the next stitch group 176. By way of example, the stitch pattern 156 can include stitch groups 176 that each extend longitudinally by approximately 36 mm along the length of the positioning lateral member 38 between the opposite stitch rows 182 thereof with the stitch rows 182 extending the full width of approximately 18 mm of each of the aligned X-shaped stitch sections 177. The longitudinal distance between the adjacent, parallel stitch rows 178 is approximately 4 mm. More generally, this longitudinal distance between stitch rows can be between approximately 2 mm to approximately 4 mm. The number of discrete stitches in a criss-cross stitch section can vary from between two to eleven stitches. The length of each of the stitch rows 178 can vary from between approximately 3 mm to approximately 22 mm.

Figure 16:
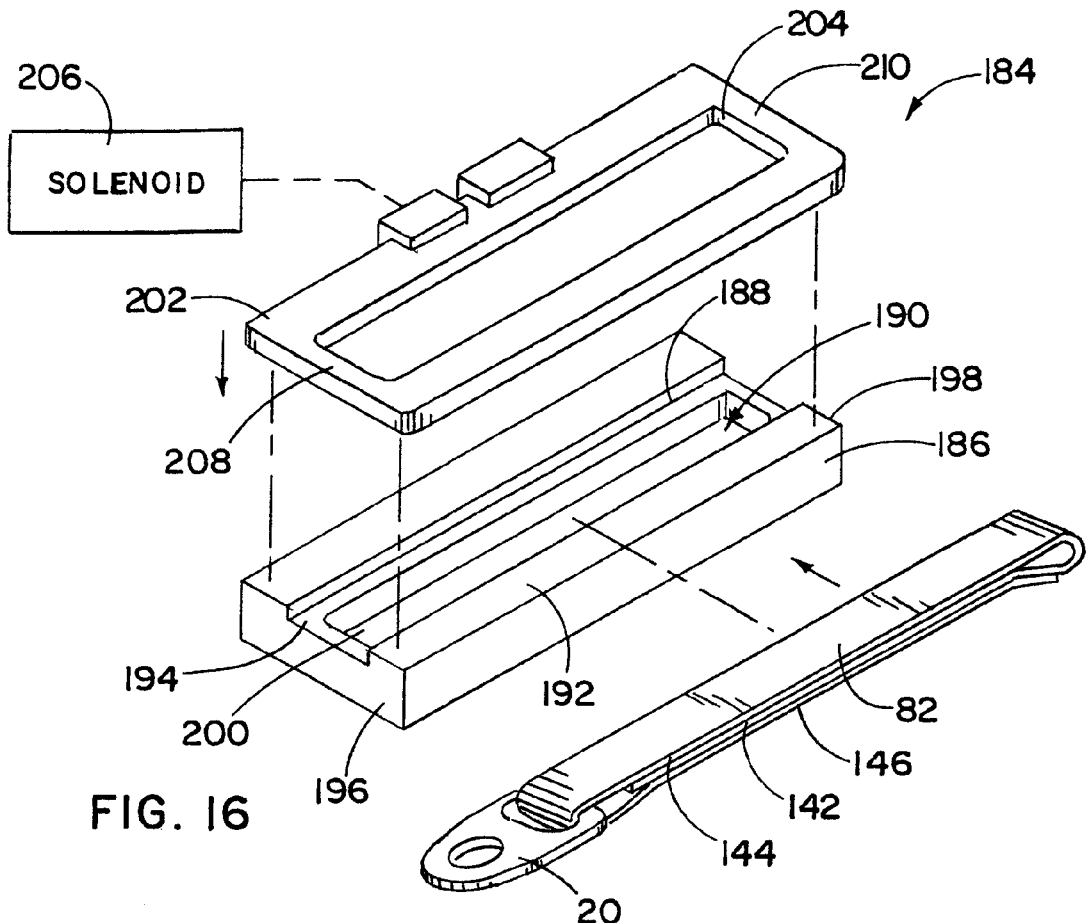

A special sewing process has been developed to handle the manufacture of the double thickness, trifold positioning member 38. As previously described, there are folding stations 88 and 90 that are utilized to make the folds in the belt webbing 83 prior to sewing of the stitch patterns 154 or 156. Also, there is a sewing station (not shown) employed between the folding stations 88 and 90 for forming the initial double-thickness, half width webbing stock 124, as has been previously described. After folding station 90, the operator removes the double thickness, trifold positioning member body 82 from the fixture with the anchor plate 20 attached thereto for being transferred to the sewing station 92, as shown in FIGS. 16-18. The sewing station 92 includes a clamping fixture 184 that is operable to hold the folded stock portions 142-146 tightly clamped together during the sewing procedure.

The clamping fixture 184 has a base member 186 including an elongate recess 188 sized to receive the folded, positioning member body 82 therein with the opposite folded ends 158 and 160 projecting out from the corresponding open ends of the recess, as can be seen in FIG. 17. The base 186 also has a central opening 190 formed in the recessed area 188 and running for almost the entire length thereof. The opening 190 can have a depth that can be slightly greater than the thickness of one of the stock portions 142-146 whereas the depth of the recess 188 can be approximately the same as the thickness of two of the stock portions 142-146.

More particularly, the base member 186 has an upper surface 192, and a recessed surface 194 that extends to either side 196 and 198 of the base member 186. The recessed distance between the upper surface 192 and recessed surface 194 is approximately the same as that of the thickness of the stock portions 142 and 144. The opening 190 is formed in the recess surface 194 and extends through to the bottom 200 of the base member 186 spaced from the recessed surface 194 by a distance corresponding to at least the thickness of the stock portion 146. In addition, it can be seen that the opening 190 does not extend all the way to either side 196 and 198 of the base member 186. All three stock portions 142-146 will be positioned on the base member and held so that the stock portion 144 is substantially flush with the base upper surface 192. The positioning member body 82 has looped ends 158 and 160 where there are only two layers of the initial stock piece 125 as provided by the transverse fold 148 between the stock portions 144 and 146 at the anchor end 158 and the transverse fold 150 between the stock portions 142 and 144 at the buckle end 160. At these ends, the positioning member body 82 only has a double layer thickness of the stock 124 which is accommodated by the sizing of the recess 188, as described above.

With the positioning member body 82 positioned on the base member 186 so that the ends 158 and 160 project slightly beyond either side 196 and 198 thereof, the clamping plate 202 of the fixture 184 is operable to be shifted downwardly toward the base member 186. The clamping plate 202 has substantially the same outer, peripheral rectangular configuration as the base member 186 and is provided with an elongate window 204 that is dimensioned to be approximately the same size as the perimeter of the central opening 190 in the base member 186. In addition, the size of the window 204 and opening 190 is such that the entire stitch pattern 154 or 156 can be formed in the exposed portion of the positioning member body 82 therein. Accordingly, when the clamping plate 202 is actuated as by a solenoid operator 206 or the like, the transverse or laterally extending ends 208 and 210 of the plate 202 are brought down into clamping engagement with the looped ends 158 and 160 of the positioning member body 82 to push the looped ends 158 and 160 tightly down onto the recessed surface 194 with the lower stock portion 146 fitting in the base member opening 190, as can be seen in FIGS. 16 and 17.

With the clamping plate 202 driven by the solenoid 206 into clamping engagement with the base member 186, and particularly the upper surface 192 thereof, the length of the positioning member body 82 that has all three stock portions 142-146 in overlying relation with each other will be exposed or aligned in the window 204 and opening 190 for the stitching operation to begin. Referring to FIG. 18, the stitch head 174 is then operated for reciprocating the needle 166 to generate either of the stitch patterns 154, 156 by appropriate programmed movement of the clamping fixture 184 below the needle head 174. The central opening 190 provides the needle 166 clearance as it pierces through the lower stock portion 146 and allows for cooperation with bobbin thread fed into the opening 190 from below the base member 186. Once the stitching is complete, the solenoid 206 is again actuated to lift the plate 202 away from the base 186, and the operator removes the completely stitched positioning member body 82 for attaching the buckle head 18 thereto.

FIGS. 19-24 are directed to another positioning member 212 having a body 214 formed of multiple layers of folded belt webbing material 40. The positioning member 212 is preferably formed from the same double-thickness, half-width, initial stock 124 of folded webbing 83 which is then folded as shown in FIGS. 22 and 23 at folding station 90. As can be seen, one difference between the positioning member 212 and positioning member 38 is that the length of the cut stock piece or member 216 between ends 218 and 220 is shorter than stock member 125. This is because while the positioning member 212 also is folded about two lateral fold lines 222 and 224 at the respective looped anchor end 227 and looped buckle end 229 of the positioning member 212 to form three stock portions 226-230 thereof, the inner stock portion 226 is shorter than the corresponding inner stock portion 142 of positioning member 38. On the other hand, the outer stock portions 228 and 230 are substantially the same length as the corresponding outer stock portions 144 and 146 of positioning member 38.

Thus, the outer stock portion 228 extends the full distance between the fold lines 222 and 224, and the outer stock portion 230 is pulled through the anchor plate slot 76 and extends to the folding post 134 and just short of the fold line 224 between the stock portions 226 and 228, as can be seen in FIG. 23. The shorter length of the stock piece 216 thus leaves only a short inner stock portion 226. Nevertheless, there are three stock portions 226-230 provided at the buckle head end 229 of the positioning member 214 similar to the positioning member 38, as best seen in FIG. 20. As such at the positioning member end 229, there are the same six layers 40a-40f of webbing material 40 as with the positioning member 38 as shown in FIG. 6 to form trifold portion 231 of the positioning member 212. On the other hand, closer to the anchor end 227, the positioning member body 214 lacks an inner stock portion extending between the outer stock portions 228 and 230, as shown in FIG. 21. Thus, only belt webbing layers 40a, 40b and 40e, 40f are present along this length of the positioning member 212 to form a bifold portion 232 thereof. Accordingly, the trifold portion 231 has the same six layers 40a-40f of belt webbing material 40 as the trifold positioning member body 82, whereas, the bifold portion 232 only has four layers 40a, 40b and 40e, 40f. As can be seen best in FIGS. 21, 23 and 24, the trifold portion 231 only extends for a relatively short distance, X, in comparison to the overall length of the positioning member 212, and therefore with respect to the length of the remaining bifold portion 232 of the positioning member body 214.

By way of the example and not limitation, the distance X can be in the range of approximately 26 mm to approximately 35 mm, with an overall length of the positioning member 212 being approximately 170 mm, leaving a length of approximately 135 mm for the bifold portion 232 of the positioning member 212. Hereinafter, when the positioning member 212 is referred to as a double thickness, bifold positioning member 212 it will be understood that it includes the short trifold portion 231 thereof. Even with only the short trifold portion 231 at the buckle head end 229 of the positioning member body 214, it has been found that the positioning member 212 provides stiffness characteristics for supporting the buckle 18 in a desirable manner akin to that of the positioning member 38. In this regard, the tensile strength component of the stiffness of the positioning member 212 is only slightly reduced over the double thickness trifold positioning member 38, as can be seen in the test results listed in FIG. 27. Similarly, the flexibility or bend strength resistance of the positioning member 212 is not too far removed from that of the positioning member 38, and in any event is significantly lower by an order of magnitude than that for the steel strap, as can be seen in the test results listed in FIGS. 29 and 30.

Figure 25:
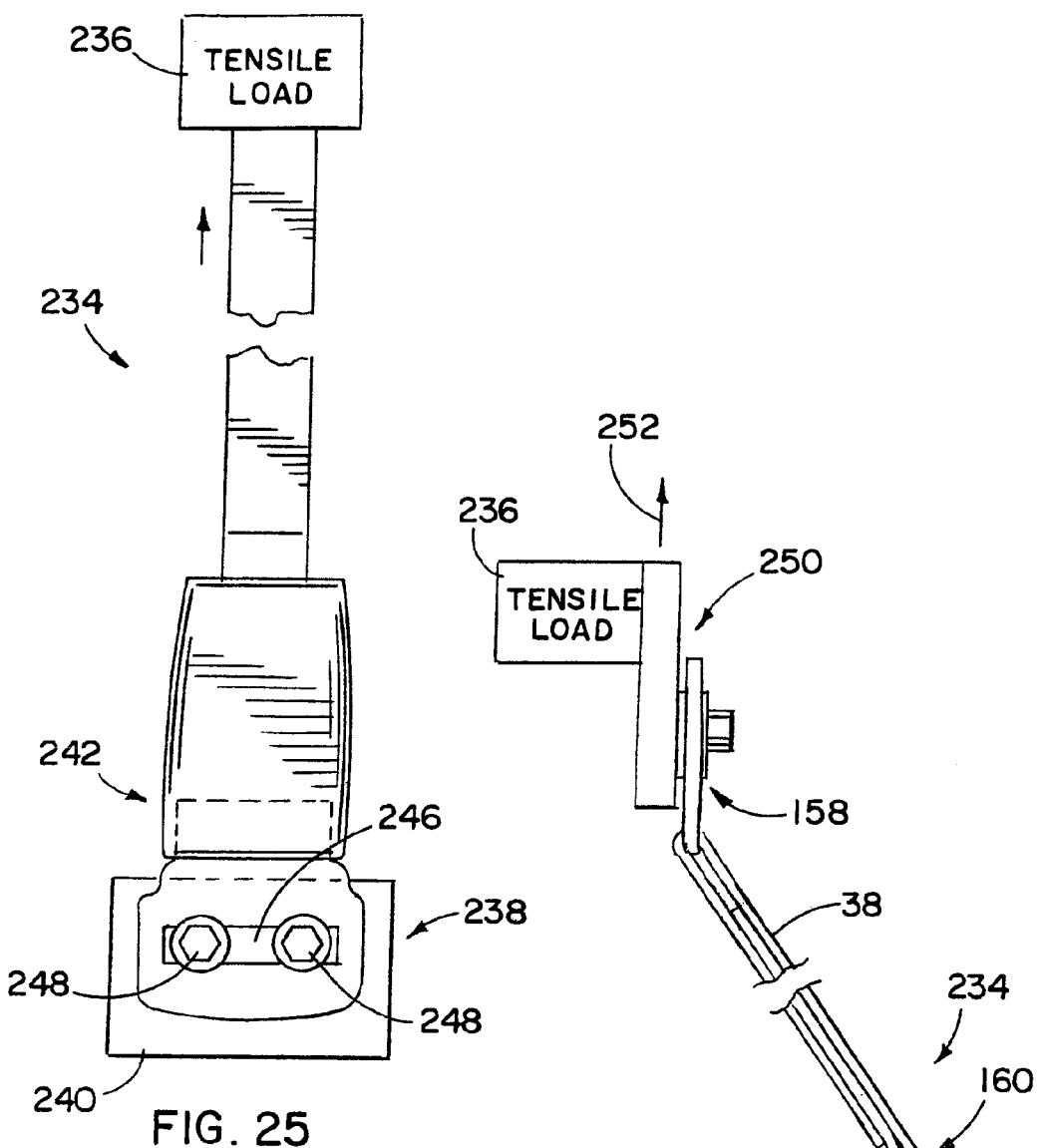
FIGS. 25 and 26 illustrate a testing rig utilized for testing the strength of the buckle support assemblies.
Figure 26:
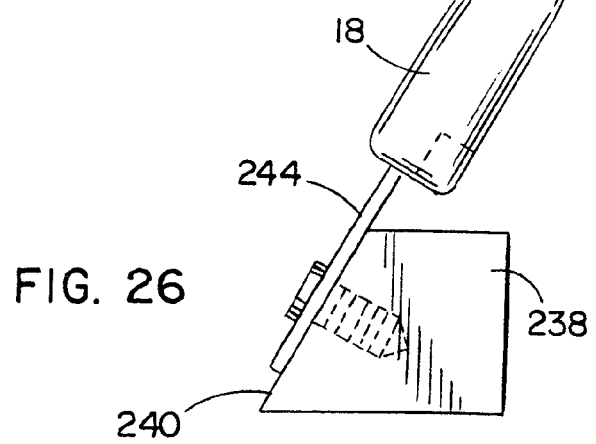

Referring to FIGS. 25 and 26, a tensile strength test rig or apparatus 234 is depicted for testing the strength of the buckle support assemblies 10 including positioning members 38 and 212 thereof upon application of a tensile load 236 thereto. The tensile loads 236 are applied until failure of the positioning member 38, 212 with the tensile force recorded. For accurate comparison purposes, six separate tests were run for both the positioning members 38 and 212, as well as the prior steel strap mounted buckle.

As can be seen, the test rig 234 has a lower mounting block 238 having an oblique mounting surface 240 for the buckle apparatus 242. The buckle apparatus 242 includes a test plate 244 latched in the buckle 18 in the opening 56 thereof. The test plate 244 is fastened to the mounting block 238 to be flush against the oblique mounting surface 240 so that the buckle 18 extends obliquely upwardly therefrom, as best seen in FIG. 26. The plate 244 has a slot 246 to allow screw fasteners 248 to be threaded into corresponding threaded apertures in the block 238 so that the plate 244 is held tightly against the block mounting surface 240. The test rig 234 includes a pulling mechanism 250 to which the illustrated positioning member 38 is secured at the anchor end 158 thereof with the pulling mechanism 250 generally oriented above the block surface 240 so that the positioning member 38 also extends at an oblique angle to the vertical.

For testing, the pulling mechanism 250 is powered to shift in a direction away from the mounting block 238 which, as illustrated, is an upward direction 252. Since the buckle apparatus 242 is rigidly held to the mounting block 238, the positioning member 38 and specifically the webbing material 40 thereof begins to stretch under the applied tensile load 236 which is carefully measured during the testing operation. All load values are recorded until failure of the positioning member 38 occurs. Generally, it is desirable for the positioning members 38 and 212 to withstand loads of at least 17.79 KN to meet industry standards (PF 8099-B, Section 5.2). As can be seen in FIG. 27, the positioning members 38 and 212 herein have tensile strength measurements that are well in excess of this minimum. In fact, the test results show that the positioning members 38 and 212 are comparable in tensile strength to the prior steel strap positioning members. More specifically, the steel strap provided tensile strength on average of approximately 24.285 KN across all six tests run pursuant to standards set forth in PF8099-A, Section III.B, and the double thickness, trifold positioning member 38 with the continuous stitch pattern 154 provided a tensile strength average of 22.575 KN across all six tensile tests therefor. This difference amounts to less than 2 KN with the average tensile strength still being significantly greater than the 17.79 KN minimum standard, i.e., by well over 4 KN. Similarly, the average tensile strength of 22.002 KN for the double thickness, trifold positioning member with the grouped stitch pattern 156 was only a little more than 2 KN in difference versus the steel strap tensile strength test average, and still is well over 4 KN more than the tensile strength minimum standard. Even with the double thickness, bifold positioning member 212 with the continuous stitch pattern 154, the average tensile strength of 20.241 KN was a little more than 2 KN lower than tensile strength of the positioning member 38 utilizing the stitch pattern 154, and over 2 KN more than the minimum tensile strength standard. Accordingly, it can be seen from a tensile strength standpoint, the stiffness provided by the positioning members 38 and 212 is comparable to that provided by the prior steel strap mounted buckles, and is also greater than the minimum standard of 17.79 KN.

Figure 28:
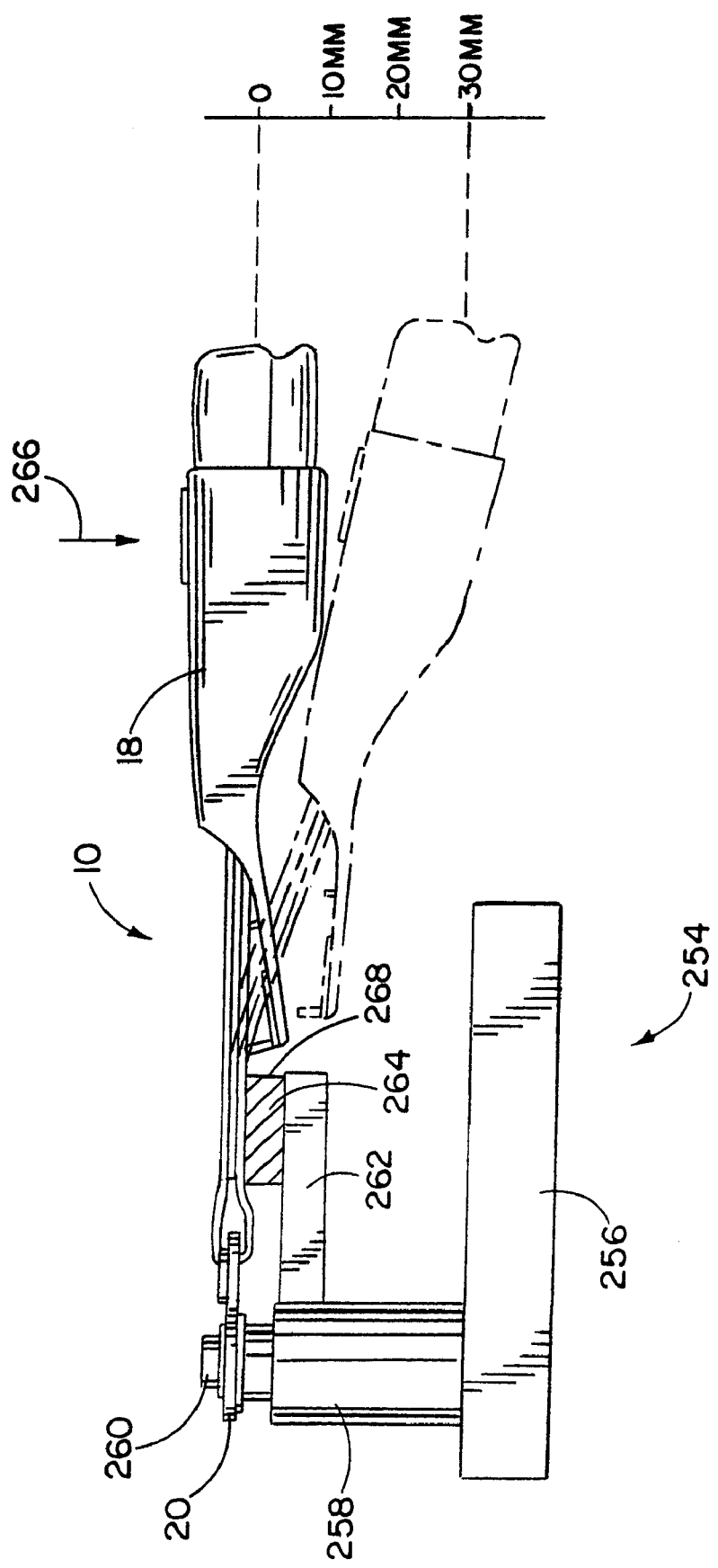
FIG. 28 is a elevational view of a test rig for testing the bend resistance of the positioning members.
Figure 31:
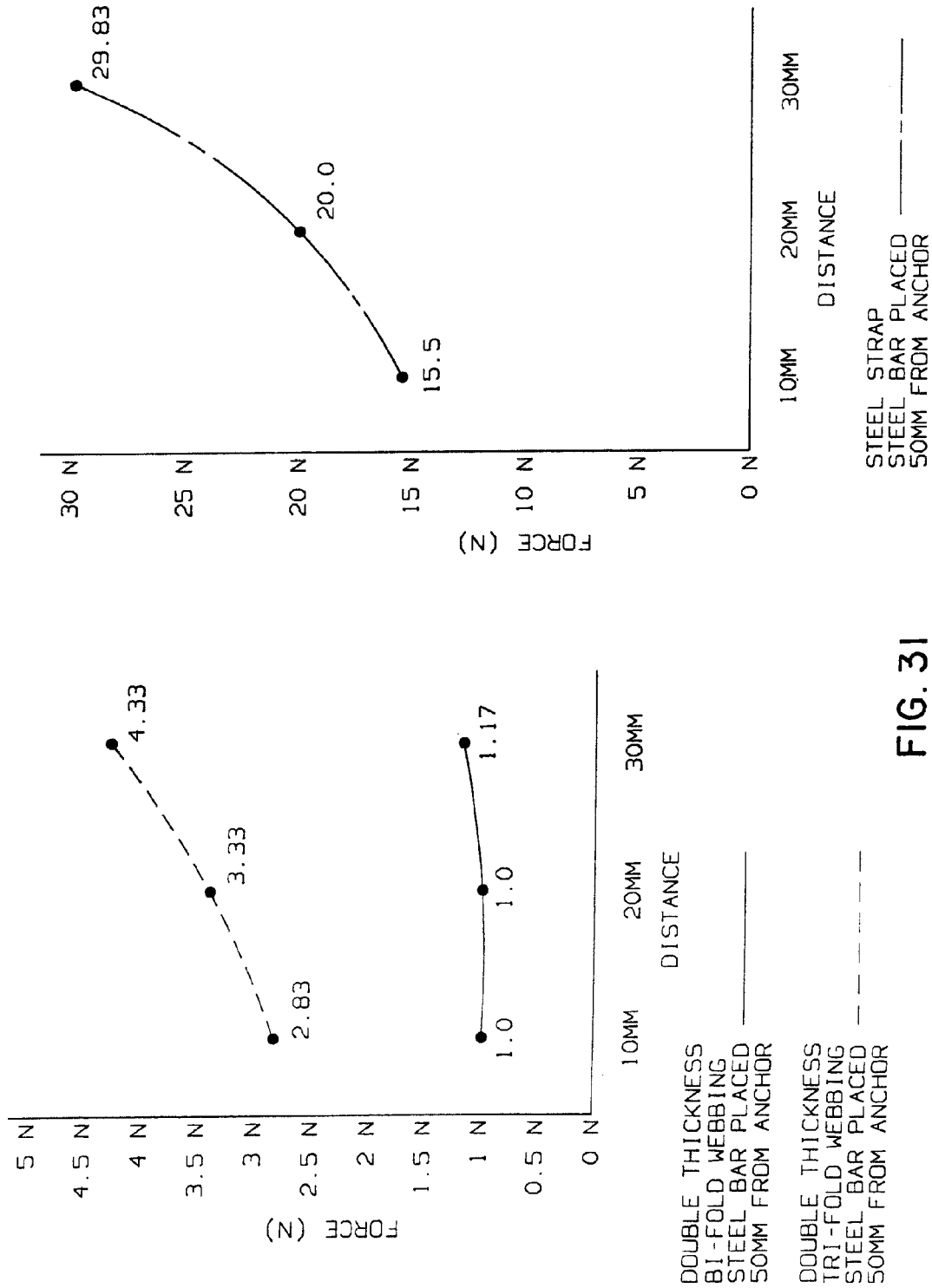
FIGS. 31 and 32 show the flexibility test results plotted on graphs for comparison purposes.

Referring next to the flexibility or bend resistance testing, the test rig or apparatus 254 utilized for this purpose is shown in FIG. 28. The test rig 254 is rigidly secured to the anchor plate 20. As can be seen the test rig 254 has a wall 256 from which a lower side extension 258 projects. The extension 258 projects at right angles to the wall 256 and receives an anchor bolt 260 which fits through the anchor plate opening 78 and can be tightened down to rigidly secure the anchor plate 20 relative to the extension 258. Between the secured anchor plate 20 and the wall 256, the rig 254 includes an adjustment plate 262 that extends upwardly from the extension member 258 along the buckle support assembly 10. The adjustment plate 262 allows a rigid bar 264 to be fixed at different positions therealong.

Figure 32:
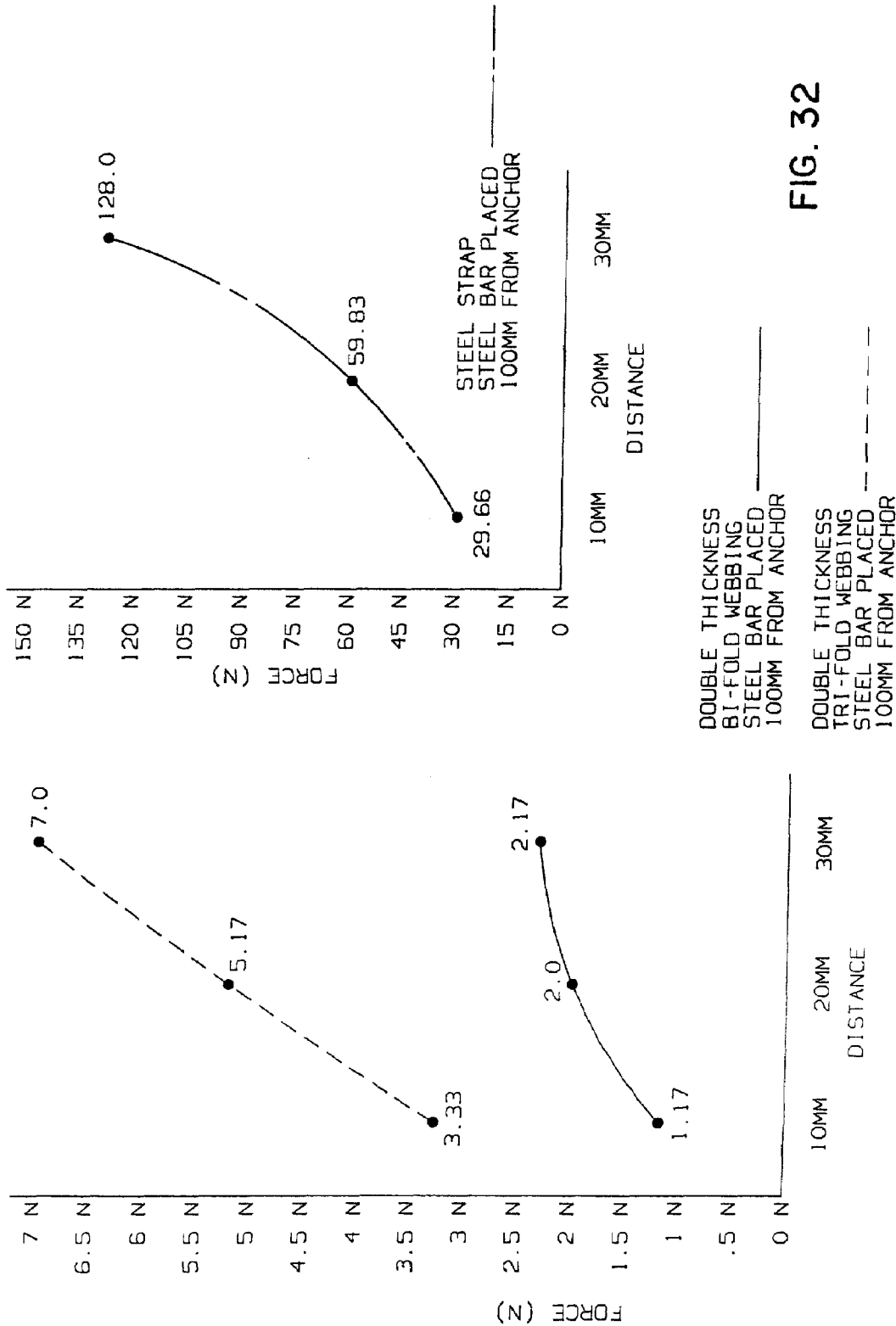

With the buckle support assembly 10 set up in the test rig 254 as described above, a transverse bend force as in direction 266 is applied to the buckle head 18 generally toward the wall 256 via a gage force device (not shown). The bar 264 can be placed at two different positions along the adjustment plate 262 so that the upper end 268 of the bar 264 is spaced at either 50 mm or 100 mm from the center of the anchor plate opening 78. At both positions of the bend bar 264, the force needed to move the buckle head 18 to three different distances, i.e. 10 mm, 20 mm and 30 mm, from a vertical position were measured, and recorded as shown in FIGS. 29 and 30, and illustrated in FIG. 28 in a not to scale, exaggerated form. These bend tests were run with both of the present positioning members 38 and 212, as well as with the prior steel strap type positioning member. For accuracy of comparison purposes, each of these tests were run six times in the same set up. Averages of the bend force were then taken and plotted as shown in FIG. 32 to better illustrate the differences.

As can be seen, the bend force differences between the steel strap and the positioning members 38 and 212 are relatively dramatic with there being an order of magnitude difference with the steel strap presenting a much more rigid mounting of the buckle head 18 over that provided by the positioning members 38 and 212. And while the differences between the double-thickness, trifold positioning member 38 and double-thickness, bifold positioning member 212 are not as great, it can be seen the double-thickness, trifold positioning member 38 while providing for flexible movement of the support assembly 10 provides more resistance to bending than the double-thickness, bifold positioning member 212 which is more desirable from an ease of buckling standpoint. In any event, it is apparent that each of the positioning members 38 and 212 provide a buckle support assembly 10 that has an optimized stiffness in terms of both providing a sufficiently rigid mounting of the buckle 18 while at the same time allowing the buckle 18 to move upon application of a relatively low transverse bend force to the support assembly 10. In this manner, buckling operations are still relatively easily performed with the buckle 18 supported by the positioning members 38 and 212 while also allowing for inadvertent passenger contact with the support assembly 10 to resiliently bend the positioning members 38 or 212 so that a hard and possibly painful contact with the support assembly 10 is avoided.

Figure 39:
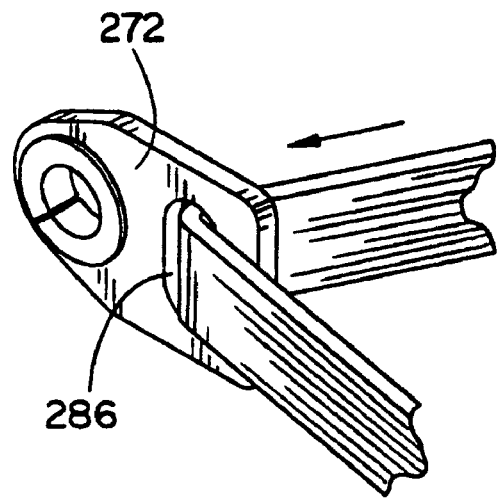
FIGS. 39-44 show the manufacturing operation for assembly of the dual buckle support assembly.
Figure 40:
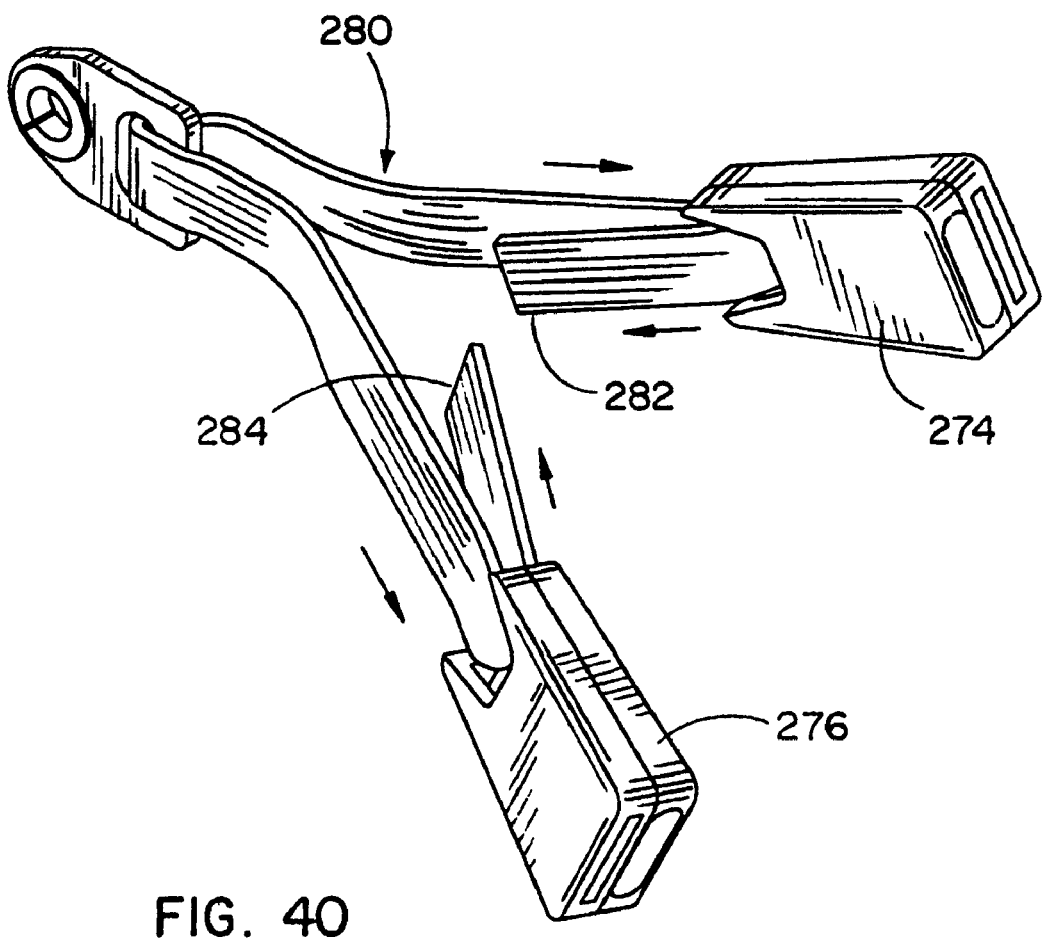
Figure 41:
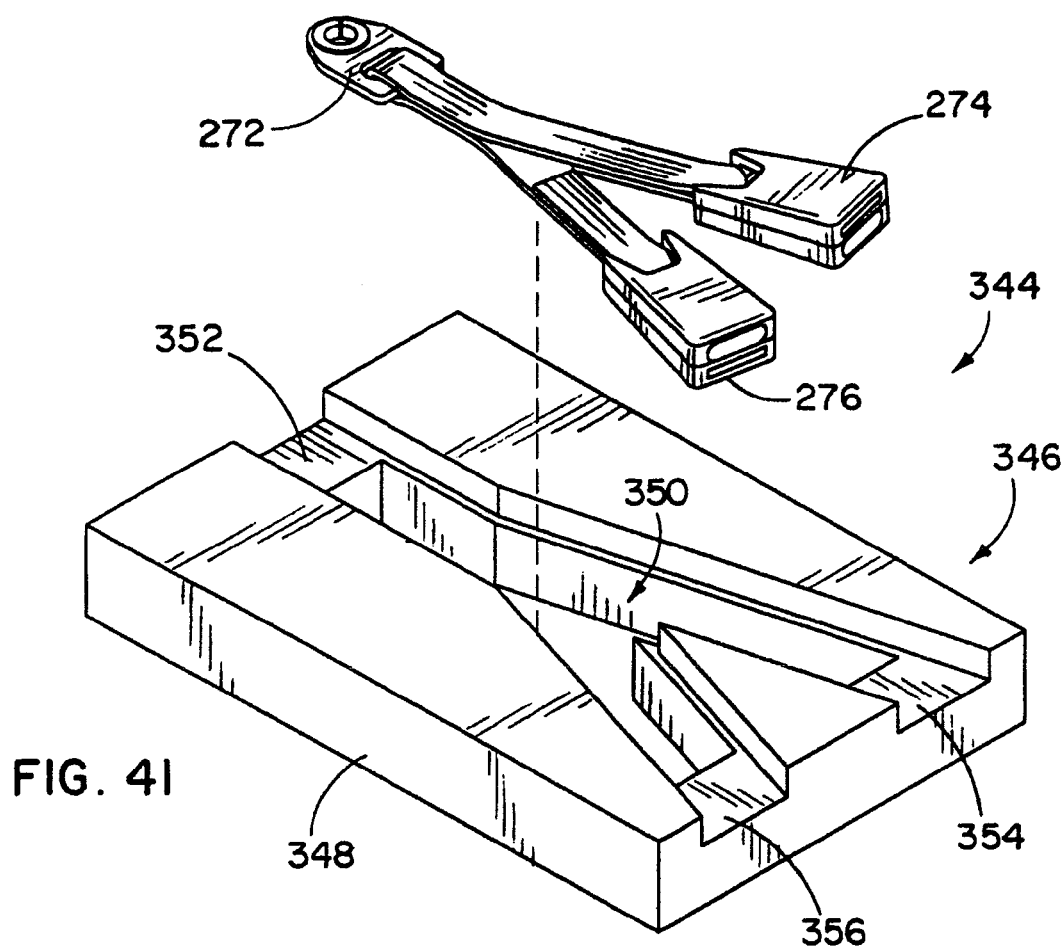

Referring next to FIGS. 33-38, a dual buckle support assembly 269 having a single support or positioning member 270 and a single anchor member 272 provided for supporting a pair of buckles 274 and 276 is shown. Like the positioning member 212, the positioning member 270 has a body 278 formed of multiple layers of folded belt webbing material 40. In this regard, the positioning member 270 is preferably formed from the same double-thickness, half-width, initial stock 124 of folded webbing 83 which is then folded as shown in FIGS. 39 and 40. Whereas the folding in FIG. 40 is shown as occurring directly at the buckles 274 and 276, it will be appreciated that such folding can occur at a fixture similar to the fixture 90 of FIGS. 14, 15 and 22, 23 with the addition of an extra folding post 134 spaced laterally from the single folding post 134 shown in these figures. Whether stitching occurs with the buckles already mounted to the positioning member 270 or prior to buckle mounting depends on the type of buckle employed.

Typically, the length of the cut stock piece or member 280 between ends 282 and 284 will be longer than the stock members 125 and 216 used for supporting single buckles 18. One difference over the positioning members 38 and 212 is that the stock member 280 is not folded to have a tri-fold configuration adjacent the buckle heads 274 and 276. Instead, the stock member 280 is laced through the slot 286 of the anchor plate member 272 and folded at approximately the midpoint between the ends 282 and 284 thereof. Accordingly, this generates a lateral fold line 288 in the positioning member 270 at the looped anchor end 290 thereof. Thereafter, the stock member ends 282 and 284 are folded about the folding posts 134 to generate lateral fold lines 292 and 294 at looped buckle ends 296 and 298, respectively. As shown in FIG. 37, the looped buckle ends 296 and 298 can fit about respective mounting posts 300 and 302 associated with the buckles 274 and 276. Alternatively, the stock member ends 296 and 298 are laced through the frame of the buckles 274 and 276 prior to stitching, as indicated by FIG. 40. Such folding and subsequent stitching as will be described in more detail hereinafter generates stock portions 304-310 of the positioning member 270 with the inner stock portions 308 and 310 approximately the same length as each other and both much shorter than associated, outer stock portions 304 and 306, as can be seen in FIG. 37.

Figure 33:
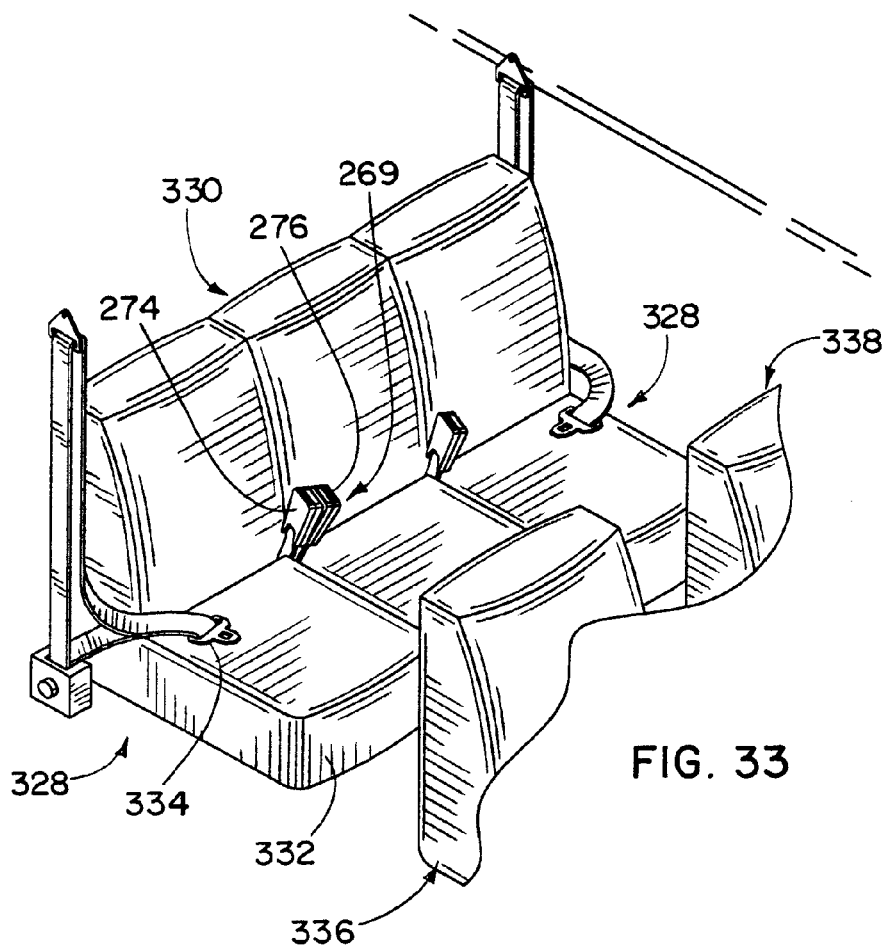
FIG. 33 is a perspective view of a dual buckle support assembly supporting a pair of buckles in an elevated position between a pair of adjacent seats.
Figure 34:
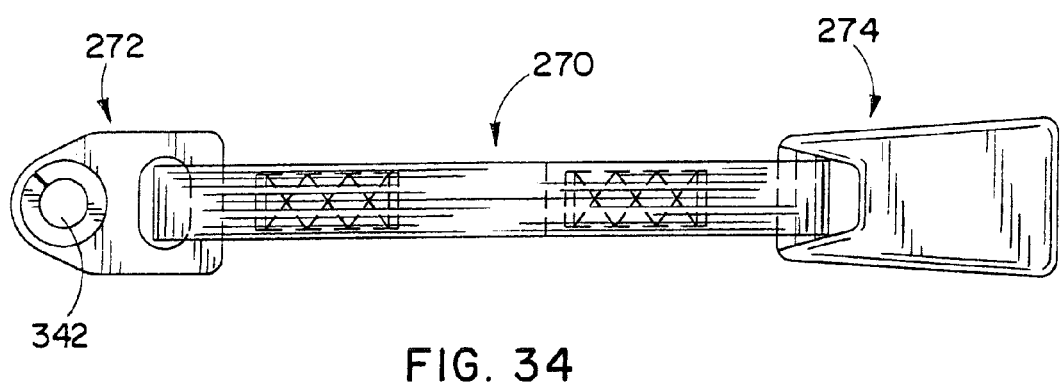
FIG. 34 is a plan view of the positioning member extending between the buckles and the anchor plate.

The stock portions 304-310 are stitched together so that each buckle 274 and 276 includes upper and lower locations where bifold portions of the positioning member 270 provide support thereto in a manner similar to the previously described positioning members 38 and 212 for buckles 18. In other words, the positioning member 270 has a controlled stiffness that is highly desirable for supporting the buckles 274 in an elevated position relative to vehicle seats, such as shown in FIG. 33. In this regard, the stiffness provided by the bi-fold positioning member 270 has an optimized combination of tensile strength and resiliency including bend strength or bend resistance as compared to prior steel strap mounted buckles.

Referring more specifically to FIGS. 35-37, it can be seen that the lower bi-fold portion 312 consists of lower sections 314 and 316 of the respective stock portions 304 and 306 that are stitched together adjacent the anchor plate member 272. This lower bifold portion 312 is common to buckles 274 and 276 so as to provide support to both. Upper bifold portion 318 consists of an upper section 320 of the stock portion 304 that is stitched to the shorter stock portion 308 adjacent the buckle 274 to provide support therefor. Accordingly, between the lower and upper bifold portions 312 and 318, only a single layer of the stock member 280 is present, albeit consisting of two layers of belt webbing material 40 as has been previously described. Similarly, upper bifold portion 322 consists of an upper section 324 of the stock portion 306 stitched to the shorter stock portion 310 adjacent the buckle 276. Between the lower bifold portion 312 and the upper bifold portion 322, there is only a single layer of the stock member 280.

Thus, the positioning member 270 is provided with more flexibility at a split, intermediate portion 326 having a V-shaped configuration leading to the upper bifold portions 318 and 322. The increased flexibility provided at the V-shaped intermediate portion 326 allows the buckles 274 to be re-oriented either from the stacked configuration shown in FIG. 35 to the offset configuration shown in FIGS. 36 and 38 depending on the specific application in the vehicle in which they are mounted. Referring to FIG. 33, the buckles 274 and 276 are shown in the stacked configuration extending between adjacent seats, such as outer seat 328 and center seat 330 in a rear row of seats. As can be seen, the positioning member 270 is effective to support the buckles 274 and 276 in a elevated position relative to the seat cushions 332. In this arrangement, the upper bi-fold portions 318 and 322 project out from the seat and support the buckles 274 and 276 above the cushion 332. If differently sized occupants are sitting on the adjacent seats 328 and 330, the flexible, intermediate portion 326 of the positioning member 270 allows the buckles 274 and 276 to be oriented at different positions from each other for providing the best orientation for receiving the respective tongue plates 334 therein. In addition, the positioning member 270 can be utilized at different locations in the vehicle such as between the front bucket seats 336 and 338 to present the buckles 274 and 276 at the inboard side of these seats in an elevated position for ease of tongue latching operations therewith. The flexible, intermediate portion 326 is also useful during manufacture of the buckle support assembly including the positioning member 270, as will be described hereinafter.

The present positioning member 270 that mounts two buckles 274 and 276 is advantageous in that it only requires a single anchor plate member 272 for anchoring the two buckles 274 and 276 to the vehicle. The anchor plate member 272 has a ferrul 340 that is fit in fastener opening 342 through which an anchor bolt secures the dual buckle support assembly 269 to a vehicle body. In this regard, single anchor members have been employed for two buckles; however, typically they have a U-shaped bracket-type of configuration with the base of the bracket fastened to the vehicle body and the legs being connected with respective support members for the buckles. Preferably, the anchor member 272 has a substantially flat anchor body 273 that is more robust than the corresponding body of anchor member 20, for instance. To this end, anchor member body 273 can have a thickness of approximately 4 mm, while the plate body of anchor member 20 has a thickness of approximately 3.2 mm. Such an increased thickness, anchor plate member 272 still provides space advantages over a U-type bracket anchor. The anchor plate member 272 also provides advantages over utilizing two thinner anchor plate members similar to anchor member 20 in terms of avoiding the increased cost of multiple anchor members and the associated ferruls as well as the need to have a second assembly operation with respect to the annular ferrul inserted in the fastener opening in the second anchor plate.

Figure 42:
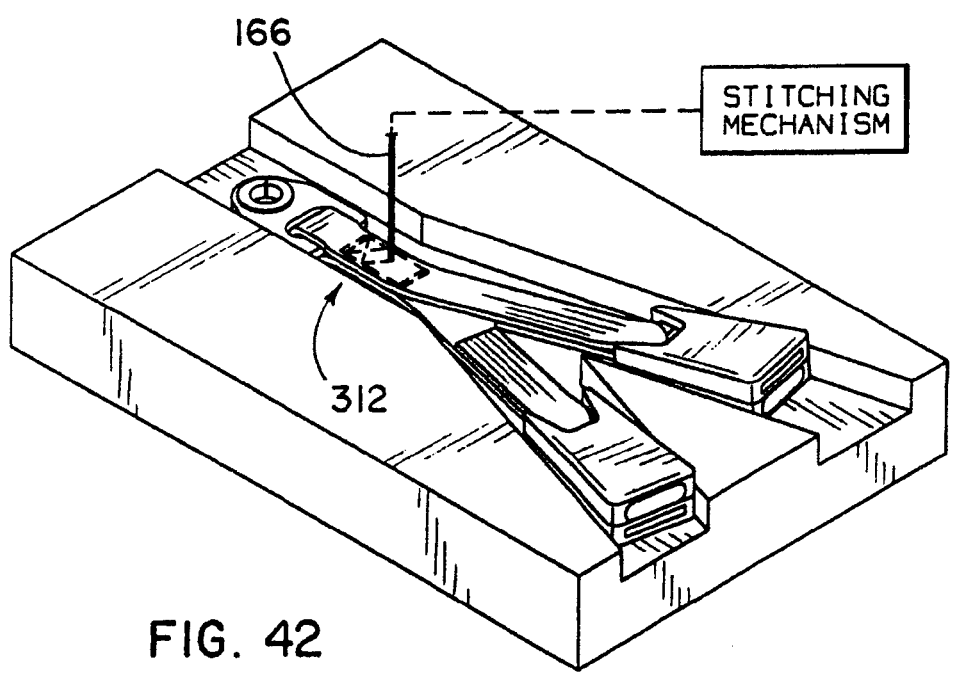
Figure 43:
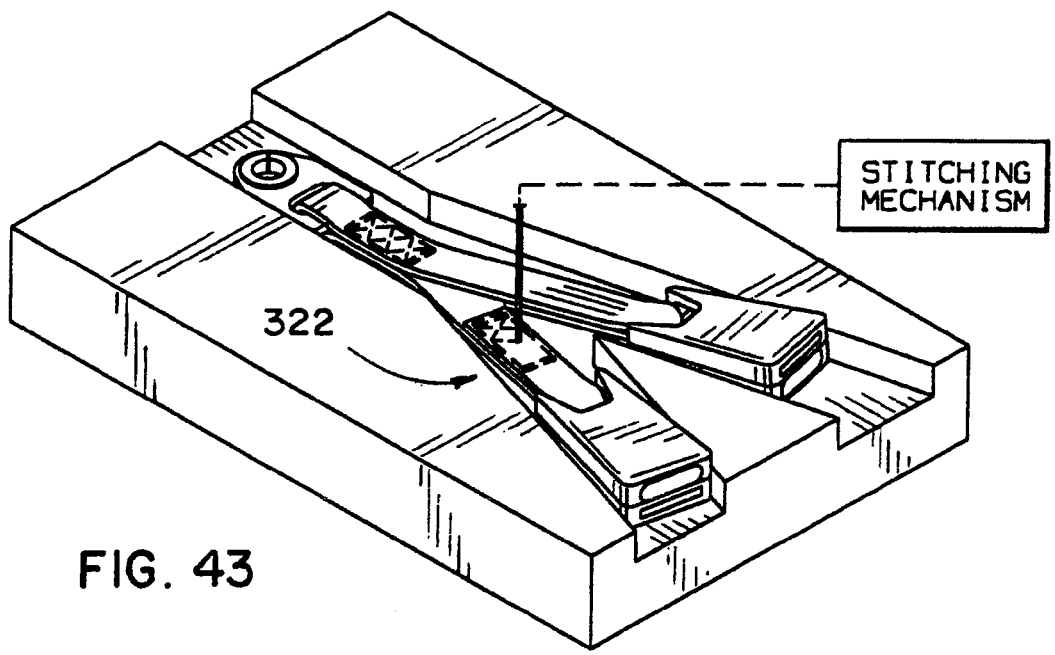
Figure 44:
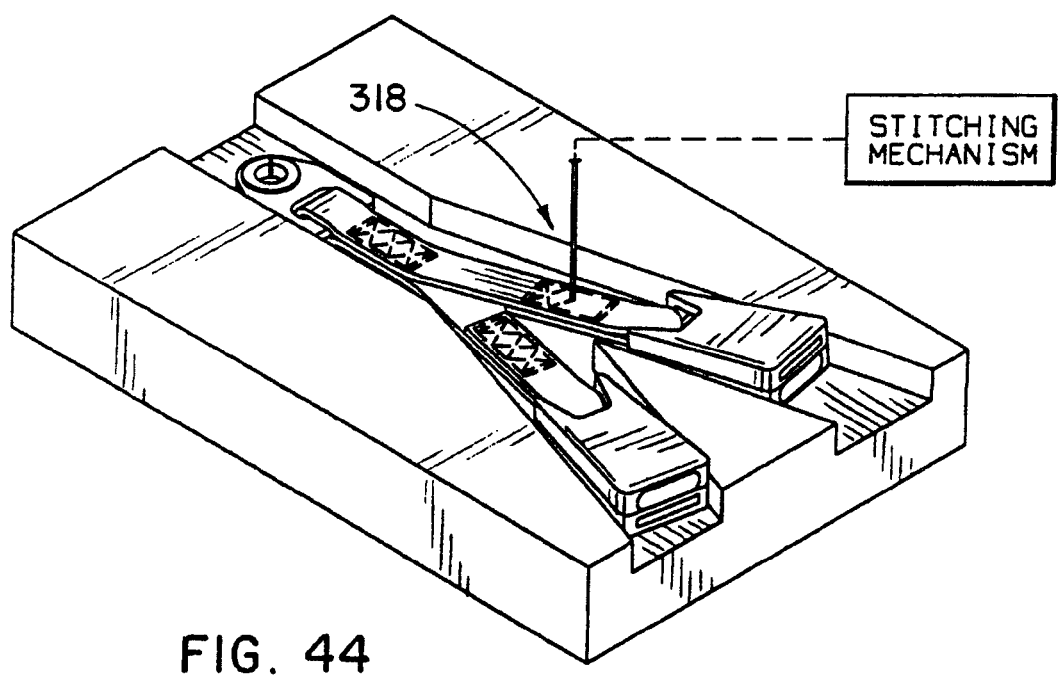

For stitching the lower and upper bifold portions 312, 318 and 322, the folded stock member 280 including the anchor member 272 is removed from its folding fixture and taken to a sewing station 344. The sewing station 344 is similar to sewing station 92 in that it includes a clamping fixture 346 similar to clamping fixture 184. However, the fixture 346 is configured to receive the substantially Y-shape configuration of the folded stock member 280 as can be readily achieved by the provision of the split, intermediate flexible portion 326 thereof. To this end, base member 348 is provided with a Y-shaped through opening 350 configured to receive the Y-shaped folded stock member 280 therein. As previously mentioned, the folded stock member 280 can include the buckles 274 and 276 as illustrated or the buckles are mounted to the looped ends 296 and 298 after the folded stock member 280 is stitched. At the three ends of the Y-shaped through opening 350, there are recesses 352, 354 and 356 so that the anchor plate 272 and either the buckles 274 and 276 or the looped ends 296 and 298 can be supported therein. Thereafter, an appropriately configured clamp member (not shown) similar to clamp member 184 is shifted down onto the base member 348 for holding the folded stock member 280 for the sewing operation via the stitching mechanism including the robust needle 166 and programmable stitch head 174, as previously has been described. FIG. 42 shows the lower bi-fold portion 312 being sewn, FIG. 43 shows the upper bi-fold portion 382 being sewn, and FIG. 44 shows the upper bi-fold portion 318 being sewn. As illustrated, the stitch pattern 154 is utilized for each of the bi-fold portions 312, 318 and 322. Stitch pattern 156 of FIG. 11 could alternatively be employed for each of the spaced, bifold portions 312, 318 and 322.

While there have been illustrated and described particular embodiments of the present invention, it will be appreciated that numerous changes and modifications will occur to those skilled in the art, and it is intended in the appended claims to cover all those changes and modifications which fall within the true spirit and scope of the present invention.

What is claimed is:

1. A method for forming a support assembly for a buckle, the method comprising:

folding a belt webbing so that there are at least four layers of belt webbing material for forming an elongate positioning member for the buckle;

attaching the buckle to an upper end of the positioning member and an anchor to a lower end of the positioning member; and stitching the four layers of belt webbing material together with stitches going through each of the four layers of belt webbing material and along the majority of the length of the elongate positioning member so that adjacent layers are tightly engaged with each other with no gaps or other material therebetween and so that the positioning member is exclusively formed of the belt webbing material with strength of the positioning member for supporting the buckle at the upper end thereof being solely provided by the belt webbing material.

2. The method of claim 1 wherein folding the belt webbing includes folding the belt webbing along at least one longitudinal fold line and sewing the folded belt webbing material together for forming a double-thickness, half-width stock of folded belt webbing material, transversely folding the stock of folded belt webbing material over a first transverse fold line, and sewing the folded-over stock of folded belt webbing material together to form the positioning member with a shortened length and increased thickness over that of the stock of folded belt webbing material.

3. The method of claim 2 including transversely folding the stock of folded belt webbing material over a second transverse fold line longitudinally spaced from the first transverse fold line to extend over and along the transversely folded belt webbing material and to be sewn thereto to form the positioning member.

4. The method of claim 2 wherein the sewing of the folded-over stock of folded belt webbing material includes sewing at least a criss-cross pattern through the folded-over stock of folded belt webbing material.

5. The method of claim 4 wherein the sewing of at least the criss-cross pattern includes sewing both the criss-cross pattern and a box pattern to extend substantially continuously along a majority of the length of the positioning member.

6. A folding and sewing system for forming a positioning member of elongate flexible webbing material for a buckle component, the folding and sewing system comprising:

a first folding fixture adapted to fold the elongate flexible webbing material about a longitudinal fold line to form folded stock webbing material;

a second folding fixture adapted to fold the folded stock webbing material about at least one transverse fold line so that there are at least four layers of folded, flexible webbing material;

a clamping fixture for securely holding the longitudinally and transversely folded webbing material for sewing thereof to form the positioning member;

a lower base member of the clamp fixture having a central and generally rectangular opening therein, and being configured to receive the positioning member thereon with the four layers of webbing material aligned with the rectangular opening thereof; and an upper clamping plate of the clamping fixture operable to be shifted down toward the lower base member to clamp the positioning member thereon with the four layers of webbing material tightly clamped together during sewing thereof, the upper clamping plate having a window therein generally aligned with the base member opening for sewing the positioning member exposed therein.

* * * * *